(12) United States Patent  (10) Patent No.: US 9,354,312 B2
Proctor  (45) Date of Patent: May 31, 2016

(54) SONAR SYSTEM USING FREQUENCY BURSTS

(71) Applicant: Navico Holding AS, Egersund (NO)

(72) Inventor: Alan Proctor, Owasso, OK (US)

(73) Assignee: NAVICO HOLDING AS, Egersund (NO)

( * ) Notice: Subject to any disclaimer, the term of this patent is extended or adjusted under 35 U.S.C. 154(b) by 629 days.

(21) Appl. No.: 13/754,519

(22) Filed: Jan. 30, 2013

(65) Prior Publication Data

US 2014/0010048 A1  Jan. 9, 2014

Related U.S. Application Data

(60) Provisional application No. 61/668,971, filed on Jul. 6, 2012.

(51) Int. Cl.
*G01S 15/89* (2006.01)
*G01S 15/10* (2006.01)

(52) U.S. Cl.
CPC ........... *G01S 15/8902* (2013.01); *G01S 15/102* (2013.01); *G01S 15/89* (2013.01)

(58) Field of Classification Search
CPC .............................. G01S 15/89; G01S 15/8902
USPC ..................................... 367/88, 101
See application file for complete search history.

(56) References Cited

U.S. PATENT DOCUMENTS

| | | |
|---|---|---|
| 1,667,540 A | 4/1928 | Dorsey |
| 1,823,329 A | 9/1931 | Marrison |
| 2,416,338 A | 2/1947 | Mason |
| 3,005,973 A | 10/1961 | Kietz |
| 3,090,030 A | 5/1963 | Schuck |
| 3,142,032 A | 7/1964 | Jones |
| 3,144,631 A | 8/1964 | Lustig et al. |
| 3,296,579 A | 1/1967 | Farr et al. |
| 3,304,532 A | 2/1967 | Nelkin et al. |

(Continued)

FOREIGN PATENT DOCUMENTS

| | | |
|---|---|---|
| DE | 1 566 870 A1 | 4/1970 |
| DE | 35 16 698 A1 | 11/1986 |

(Continued)

OTHER PUBLICATIONS

Anderson, K.; "Side-Scanning for Sport Fishing"; Salt Water Sportsman; Apr. 1, 2009; 4 pages.

(Continued)

*Primary Examiner* — Ian J Lobo
(74) *Attorney, Agent, or Firm* — Nelson Mullins Riley & Scarborough LLP

(57) ABSTRACT

A sonar system using frequency bursts. A sonar system for use with a vessel may include a sonar module having a transmitting element configured to generate a transmit signal, where the transmit signal comprises one or more bursts, and where at least one burst comprises a first portion having a first frequency and a second portion having a second frequency different than the first frequency. The sonar system may also include a transducer array in communication with the sonar module, where the transducer array is configured to (i) receive the transmit signal from the transmitting element, (ii) produce one or more sonar beams based on the first frequency and the second frequency, and (iii) receive one or more sonar return signals from an underwater environment.

21 Claims, 6 Drawing Sheets

(56) References Cited

U.S. PATENT DOCUMENTS

| | | | |
|---|---|---|---|
| 3,359,537 A | 12/1967 | Geil et al. | |
| 3,381,264 A | 4/1968 | Lavergne et al. | |
| 3,451,038 A | 6/1969 | Maass | |
| 3,458,854 A | 7/1969 | Murphree | |
| 3,484,737 A | 12/1969 | Walsh | |
| 3,496,524 A | 2/1970 | Stavis et al. | |
| 3,553,638 A | 1/1971 | Sublett | |
| 3,585,578 A | 6/1971 | Fischer, Jr. et al. | |
| 3,585,579 A | 6/1971 | Dorr et al. | |
| 3,618,006 A | 11/1971 | Wright | |
| 3,624,596 A | 11/1971 | Dickenson et al. | |
| 3,716,824 A | 2/1973 | Door et al. | |
| 3,742,436 A | 6/1973 | Jones | |
| 3,753,219 A | 8/1973 | King, Jr. | |
| 3,757,287 A | 9/1973 | Bealor, Jr. | |
| 3,781,775 A | 12/1973 | Malloy et al. | |
| 3,895,339 A | 7/1975 | Jones et al. | |
| 3,895,340 A | 7/1975 | Gilmour | |
| 3,898,608 A | 8/1975 | Jones et al. | |
| 3,907,239 A | 9/1975 | Ehrlich | |
| 3,922,631 A | 11/1975 | Thompson et al. | |
| 3,949,348 A | 4/1976 | Dorr | |
| 3,950,723 A | 4/1976 | Gilmour | |
| 3,953,828 A | 4/1976 | Cook | |
| 3,964,424 A | 6/1976 | Hagemann | |
| 3,967,234 A | 6/1976 | Jones | |
| 3,975,704 A | 8/1976 | Klein | |
| 4,030,096 A | 6/1977 | Stevens et al. | |
| 4,047,148 A | 9/1977 | Hagemann | |
| 4,052,693 A | 10/1977 | Gilmour | |
| 4,063,212 A | 12/1977 | Sublett | |
| 4,068,209 A | 1/1978 | Lagier | |
| 4,075,599 A | 2/1978 | Kosalos et al. | |
| 4,096,484 A | 6/1978 | Ferre et al. | |
| 4,121,190 A | 10/1978 | Edgerton et al. | |
| 4,180,792 A | 12/1979 | Lederman et al. | |
| 4,184,210 A | 1/1980 | Hagemann | |
| 4,195,702 A | 4/1980 | Denis | |
| 4,197,591 A | 4/1980 | Hagemann | |
| 4,198,702 A | 4/1980 | Clifford | |
| 4,199,746 A | 4/1980 | Jones et al. | |
| 4,200,922 A | 4/1980 | Hagemann | |
| 4,204,281 A | 5/1980 | Hagemann | |
| 4,207,620 A | 6/1980 | Morgera | |
| 4,208,738 A | 6/1980 | Lamborn | |
| 4,216,537 A | 8/1980 | Delignieres | |
| 4,232,380 A | 11/1980 | Caron et al. | |
| 4,247,923 A | 1/1981 | De Kok | |
| 4,262,344 A | 4/1981 | Gilmour | |
| 4,287,578 A | 9/1981 | Heyser | |
| 4,347,591 A | 8/1982 | Stembridge et al. | |
| RE31,026 E | 9/1982 | Shatto | |
| 4,400,803 A | 8/1983 | Spiess et al. | |
| 4,413,331 A | 11/1983 | Rowe, Jr. et al. | |
| 4,422,166 A | 12/1983 | Klein | |
| 4,456,210 A | 6/1984 | McBride | |
| 4,458,342 A | 7/1984 | Tournois | |
| 4,493,064 A | 1/1985 | Odero et al. | |
| 4,496,064 A | 1/1985 | Beck et al. | |
| 4,538,249 A | 8/1985 | Richard | |
| 4,561,076 A | 12/1985 | Gritsch | |
| 4,596,007 A | 6/1986 | Grall et al. | |
| 4,635,240 A | 1/1987 | Geohegan, Jr. et al. | |
| 4,641,290 A | 2/1987 | Massa et al. | |
| 4,642,801 A | 2/1987 | Perny | |
| 4,751,645 A | 6/1988 | Abrams et al. | |
| 4,774,837 A | 10/1988 | Bird | |
| 4,796,238 A | 1/1989 | Bourgeois et al. | |
| 4,802,148 A | 1/1989 | Gilmour | |
| 4,815,045 A | 3/1989 | Nakamura | |
| 4,829,493 A | 5/1989 | Bailey | |
| 4,855,961 A | 8/1989 | Jaffe et al. | |
| 4,879,697 A | 11/1989 | Lowrance et al. | |
| 4,907,208 A | 3/1990 | Lowrance et al. | |
| 4,912,685 A | 3/1990 | Gilmour | |
| 4,924,448 A | 5/1990 | Gaer | |
| 4,935,906 A | 6/1990 | Baker et al. | |
| 4,939,700 A | 7/1990 | Breton | |
| 4,958,330 A | 9/1990 | Higgins | |
| 4,970,700 A | 11/1990 | Gilmour et al. | |
| 4,972,387 A | 11/1990 | Warner | |
| 4,975,887 A | 12/1990 | Maccabee et al. | |
| 4,982,924 A | 1/1991 | Havins | |
| 5,025,423 A | 6/1991 | Earp | |
| 5,033,029 A | 7/1991 | Jones | |
| 5,077,699 A | 12/1991 | Passamante et al. | |
| 5,109,364 A | 4/1992 | Stiner | |
| 5,113,377 A | 5/1992 | Johnson | |
| 5,142,497 A | 8/1992 | Warrow | |
| 5,142,502 A | 8/1992 | Wilcox et al. | |
| D329,615 S | 9/1992 | Stiner | |
| D329,616 S | 9/1992 | Stiner | |
| 5,155,706 A | 10/1992 | Haley et al. | |
| 5,159,226 A | 10/1992 | Montgomery | |
| 5,182,732 A | 1/1993 | Pichowkin | |
| 5,184,330 A | 2/1993 | Adams et al. | |
| 5,191,341 A | 3/1993 | Gouard et al. | |
| 5,200,931 A | 4/1993 | Kosalos et al. | |
| 5,214,744 A | 5/1993 | Schweizer et al. | |
| 5,231,609 A | 7/1993 | Gaer | |
| 5,237,541 A | 8/1993 | Woodsum | |
| 5,241,314 A | 8/1993 | Keeler et al. | |
| 5,243,567 A | 9/1993 | Gingerich | |
| 5,245,587 A | 9/1993 | Hutson | |
| 5,257,241 A | 10/1993 | Henderson et al. | |
| 5,260,912 A | 11/1993 | Latham | |
| 5,276,453 A * | 1/1994 | Heymsfield et al. | 342/112 |
| 5,297,109 A | 3/1994 | Barksdale, Jr. et al. | |
| 5,299,173 A | 3/1994 | Ingram | |
| 5,303,208 A | 4/1994 | Dorr | |
| 5,376,933 A | 12/1994 | Tupper et al. | |
| 5,390,152 A | 2/1995 | Boucher et al. | |
| 5,412,618 A | 5/1995 | Gilmour | |
| 5,433,202 A | 7/1995 | Mitchell et al. | |
| 5,438,552 A | 8/1995 | Audi et al. | |
| 5,442,358 A | 8/1995 | Keeler et al. | |
| 5,455,806 A | 10/1995 | Hutson | |
| 5,485,432 A | 1/1996 | Aechter et al. | |
| 5,493,619 A | 2/1996 | Haley et al. | |
| 5,515,337 A | 5/1996 | Gilmour et al. | |
| 5,525,081 A | 6/1996 | Mardesich et al. | |
| 5,526,765 A | 6/1996 | Ahearn | |
| 5,537,366 A | 7/1996 | Gilmour | |
| 5,537,380 A | 7/1996 | Sprankle, Jr. et al. | |
| 5,546,356 A | 8/1996 | Zehner | |
| 5,546,362 A | 8/1996 | Baumann et al. | |
| 5,561,641 A | 10/1996 | Nishimori et al. | |
| 5,574,700 A | 11/1996 | Chapman | |
| 5,596,549 A | 1/1997 | Sheriff | |
| 5,596,550 A | 1/1997 | Rowe, Jr. et al. | |
| 5,602,801 A | 2/1997 | Nussbaum et al. | |
| 5,612,928 A | 3/1997 | Haley et al. | |
| 5,623,524 A | 4/1997 | Weiss et al. | |
| 5,675,552 A | 10/1997 | Hicks et al. | |
| 5,694,372 A | 12/1997 | Perennes | |
| 5,790,474 A | 8/1998 | Feintuch | |
| 5,805,525 A | 9/1998 | Sabol et al. | |
| 5,805,528 A | 9/1998 | Hamada et al. | |
| 5,808,967 A | 9/1998 | Yu et al. | |
| 5,838,635 A | 11/1998 | Masreliez | |
| 5,850,372 A | 12/1998 | Blue | |
| 5,930,199 A | 7/1999 | Wilk | |
| 5,991,239 A | 11/1999 | Fatemi-Booshehri et al. | |
| 6,002,644 A | 12/1999 | Wilk | |
| 6,084,827 A | 7/2000 | Johnson et al. | |
| 6,130,641 A | 10/2000 | Kraeutner et al. | |
| 6,215,730 B1 | 4/2001 | Pinto | |
| 6,225,984 B1 | 5/2001 | Crawford | |
| 6,226,227 B1 | 5/2001 | Lent et al. | |
| 6,273,771 B1 | 8/2001 | Buckley et al. | |
| 6,285,628 B1 | 9/2001 | Kiesel | |
| 6,321,158 B1 | 11/2001 | DeLorme et al. | |
| 6,325,020 B1 | 12/2001 | Guigne et al. | |
| 6,335,905 B1 | 1/2002 | Kabel | |

(56) References Cited

U.S. PATENT DOCUMENTS

| | | |
|---|---|---|
| 6,411,283 B1 | 6/2002 | Murphy |
| 6,418,080 B2 | 7/2002 | Inouchi |
| 6,421,299 B1 | 7/2002 | Betts et al. |
| 6,421,301 B1 | 7/2002 | Scanlon |
| 6,445,646 B1 | 9/2002 | Handa et al. |
| 6,449,215 B1 | 9/2002 | Shell |
| 6,537,224 B2 | 3/2003 | Mauchamp et al. |
| 6,606,958 B1 | 8/2003 | Bouyoucos |
| 6,678,403 B1 | 1/2004 | Wilk |
| 6,738,311 B1 | 5/2004 | Guigne |
| 6,761,692 B2 | 7/2004 | Angelsen et al. |
| 6,778,468 B1 | 8/2004 | Nishimori et al. |
| 6,816,782 B1 | 11/2004 | Walters et al. |
| 6,842,401 B2 | 1/2005 | Chiang et al. |
| 6,899,574 B1 | 5/2005 | Kalis et al. |
| 6,904,798 B2 | 6/2005 | Boucher et al. |
| 6,941,226 B2 | 9/2005 | Estep |
| 6,980,688 B2 | 12/2005 | Wilk |
| 7,002,579 B2 | 2/2006 | Olson |
| 7,035,166 B2 | 4/2006 | Zimmerman et al. |
| 7,036,451 B1 | 5/2006 | Hutchinson |
| 7,215,599 B2 | 5/2007 | Nishimori et al. |
| 7,236,426 B2 | 6/2007 | Turner et al. |
| 7,236,427 B1 | 6/2007 | Schroeder |
| 7,239,263 B1 | 7/2007 | Sawa |
| 7,242,638 B2 | 7/2007 | Kerfoot et al. |
| 7,305,929 B2 | 12/2007 | MacDonald et al. |
| 7,339,494 B2 | 3/2008 | Shah et al. |
| 7,355,924 B2 | 4/2008 | Zimmerman et al. |
| 7,369,459 B2 | 5/2008 | Kawabata et al. |
| 7,405,999 B2 | 7/2008 | Skjold-Larsen |
| 7,430,461 B1 | 9/2008 | Michaels |
| 7,542,376 B1 | 6/2009 | Thompson et al. |
| 7,652,952 B2 | 1/2010 | Betts et al. |
| 7,710,825 B2 | 5/2010 | Betts et al. |
| 7,729,203 B2 | 6/2010 | Betts et al. |
| 7,755,974 B2 | 7/2010 | Betts et al. |
| 7,812,667 B2 | 10/2010 | Fagg |
| 7,839,720 B2 | 11/2010 | Brumley et al. |
| 7,870,496 B1 | 1/2011 | Sherwani |
| 7,889,600 B2 | 2/2011 | Thompson et al. |
| 7,890,867 B1 | 2/2011 | Margulis |
| 7,961,552 B2 | 6/2011 | Boucher et al. |
| 8,019,532 B2 | 9/2011 | Sheha et al. |
| 8,063,540 B2 | 11/2011 | Angelsen et al. |
| 8,300,499 B2 | 10/2012 | Coleman et al. |
| 8,305,840 B2 | 11/2012 | Maguire |
| 8,305,841 B2 | 11/2012 | Riordan et al. |
| 8,514,658 B2 | 8/2013 | Maguire |
| 8,605,550 B2 | 12/2013 | Maguire |
| 2001/0026499 A1 | 10/2001 | Inouchi |
| 2002/0035574 A1 | 3/2002 | Dumas |
| 2002/0071029 A1 | 6/2002 | Zell et al. |
| 2002/0085452 A1 | 7/2002 | Scanlon |
| 2002/0093541 A1 | 7/2002 | Schileru-Key |
| 2002/0126577 A1 | 9/2002 | Borchardt |
| 2003/0202426 A1 | 10/2003 | Ishihara et al. |
| 2003/0206489 A1 | 11/2003 | Preston et al. |
| 2003/0214880 A1 | 11/2003 | Rowe |
| 2004/0184351 A1 | 9/2004 | Nishimori et al. |
| 2004/0193364 A1 | 9/2004 | Chojnacki |
| 2004/0221468 A1 | 11/2004 | Cotterchio et al. |
| 2005/0036404 A1 | 2/2005 | Zhu et al. |
| 2005/0043619 A1 | 2/2005 | Sumanaweera et al. |
| 2005/0099887 A1 | 5/2005 | Zimmerman et al. |
| 2005/0102101 A1 | 5/2005 | Beesley et al. |
| 2005/0216487 A1 | 9/2005 | Fisher et al. |
| 2006/0002232 A1 | 1/2006 | Shah et al. |
| 2006/0013066 A1 | 1/2006 | Nishimori et al. |
| 2006/0023570 A1 | 2/2006 | Betts et al. |
| 2006/0119585 A1 | 6/2006 | Skinner |
| 2006/0224940 A1 | 10/2006 | Lee |
| 2007/0025183 A1 | 2/2007 | Zimmerman et al. |
| 2007/0091723 A1 | 4/2007 | Zhu et al. |
| 2007/0159922 A1 | 7/2007 | Zimmerman et al. |
| 2007/0208280 A1 | 9/2007 | Talish et al. |
| 2008/0013404 A1 | 1/2008 | Acker et al. |
| 2008/0126935 A1 | 5/2008 | Blomgren |
| 2008/0137483 A1 | 6/2008 | Sawrie |
| 2008/0204424 A1 | 8/2008 | Jin et al. |
| 2009/0031940 A1 | 2/2009 | Stone et al. |
| 2009/0064055 A1 | 3/2009 | Chaudhri et al. |
| 2009/0099871 A1 | 4/2009 | Gadodia |
| 2009/0179789 A1 | 7/2009 | Haughay, Jr. et al. |
| 2009/0249247 A1 | 10/2009 | Tseng et al. |
| 2009/0287409 A1 | 11/2009 | Summers |
| 2010/0080082 A1 | 4/2010 | Betts et al. |
| 2010/0097891 A1 | 4/2010 | Cummings |
| 2010/0145601 A1 | 6/2010 | Kurtti et al. |
| 2010/0199225 A1 | 8/2010 | Coleman et al. |
| 2010/0226203 A1 | 9/2010 | Buttle et al. |
| 2010/0250122 A1 | 9/2010 | Kubota et al. |
| 2010/0277379 A1 | 11/2010 | Lindackers et al. |
| 2011/0007606 A1 | 1/2011 | Curtis |
| 2011/0012773 A1 | 1/2011 | Cunning et al. |
| 2011/0013484 A1 | 1/2011 | Coleman et al. |
| 2011/0013485 A1 | 1/2011 | Maguire |
| 2011/0019887 A1 | 1/2011 | Roehrig et al. |
| 2011/0025720 A1 | 2/2011 | Jo et al. |
| 2011/0154183 A1 | 6/2011 | Burns et al. |
| 2011/0238762 A1 | 9/2011 | Soni et al. |
| 2012/0001773 A1 | 1/2012 | Lyons et al. |
| 2012/0011437 A1 | 1/2012 | James et al. |
| 2012/0014220 A1 | 1/2012 | DePasqua |
| 2012/0069712 A1 | 3/2012 | Potanin et al. |
| 2012/0106300 A1 | 5/2012 | Maguire |
| 2012/0163126 A1 | 6/2012 | Campbell et al. |
| 2012/0185801 A1 | 7/2012 | Madonna et al. |
| 2013/0007665 A1 | 1/2013 | Chaudhri et al. |
| 2013/0016588 A1 | 1/2013 | O'Dell |
| 2013/0148471 A1 | 6/2013 | Brown et al. |
| 2013/0208568 A1 | 8/2013 | Coleman |
| 2014/0064024 A1 | 3/2014 | Maguire |

FOREIGN PATENT DOCUMENTS

| | | |
|---|---|---|
| EP | 1 272 870 B1 | 4/2004 |
| EP | 1 393 025 B1 | 2/2006 |
| EP | 2 070 068 B1 | 3/2008 |
| EP | 2 023 159 A1 | 2/2009 |
| GB | 823304 A | 11/1959 |
| GB | 1 306 769 | 2/1973 |
| GB | 1 315 651 A | 5/1973 |
| GB | 1316138 | 5/1973 |
| GB | 1 329 829 A | 9/1973 |
| GB | 1 330 472 A | 9/1973 |
| GB | 2 111 679 A | 7/1983 |
| GB | 2 421 312 A | 6/2006 |
| GB | 2 444 161 A | 5/2008 |
| JP | 50-109389 U | 9/1975 |
| JP | 54-054365 U | 4/1979 |
| JP | 57-046173 A | 3/1982 |
| JP | 58-079178 A | 5/1983 |
| JP | S-59-107285 A | 6/1984 |
| JP | S-61-102574 A | 5/1986 |
| JP | 61-116678 A | 6/1986 |
| JP | S-61-262674 A | 11/1986 |
| JP | 62-099877 U | 6/1987 |
| JP | 62-134084 U | 8/1987 |
| JP | 62-190480 A | 8/1987 |
| JP | 63-261181 A | 10/1988 |
| JP | H02-159591 A | 6/1990 |
| JP | H-03-85476 A | 4/1991 |
| JP | 4-357487 A | 12/1992 |
| JP | 4357487 A | 12/1992 |
| JP | 7-031042 A | 1/1995 |
| JP | 07-270523 A | 10/1995 |
| JP | H-10-123247 A | 5/1998 |
| JP | H-10-132930 A | 5/1998 |
| JP | 10-186030 A | 7/1998 |
| JP | H-10-325871 A | 12/1998 |
| JP | 2001-74840 A | 3/2001 |
| JP | 2002-168592 A | 6/2002 |
| JP | 2004-020276 A | 1/2004 |

(56) References Cited

FOREIGN PATENT DOCUMENTS

| JP | 2004-219400 A | 8/2004 |
|---|---|---|
| JP | 2005-091307 A | 4/2005 |
| JP | 2006-064524 A | 3/2006 |
| JP | 2006-162480 A | 6/2006 |
| JP | 2006-208300 A | 8/2006 |
| JP | 2008-508539 | 3/2008 |
| JP | 2008-128900 A | 6/2008 |
| JP | 2009-222414 A | 10/2009 |
| JP | 2010-030340 A | 2/2010 |
| WO | WO 84/01833 A1 | 5/1984 |
| WO | WO-91/02989 A1 | 3/1991 |
| WO | WO 98/15846 | 4/1998 |
| WO | WO 03/009276 A2 | 1/2003 |
| WO | WO-2005/057234 A1 | 6/2005 |
| WO | WO-2008/105932 A2 | 9/2008 |
| WO | WO-2008/152618 A1 | 12/2008 |
| WO | WO 2011/008429 A1 | 1/2011 |

OTHER PUBLICATIONS

Andrew, C., et al.; "Setup and Trouble shooting Procedures for the Klein 5500 Sidescan Sonar"; Australian Government; Department of Defence; Maritime Operations Division; Systems Sciences Laboratory; Published Nov. 2003.

Armstrong, A.A., et al.; "New Tecnology for Shallow Water Hydrographic Surveys"; Proceedings of the 25$^{th}$ Joint Meeting of UJNR Sea-bottom Surveys Panel; Dec. 1996.

Asplin, R.G., et al.; "A new Generation Side Scan Sonar"; OCEANS '88 Proceedings. 'A Partnership of Marine Interests'; vol. 2; Oct.-Nov. 1988; pp. 329-334.

Australian Government, Department of Sustainability, Environment, Water, Population and Communities; Fact Sheet—The RV Tangaroa; date unknown; 3 pages.

Baker, N., et al, "Rifting History of the Northern Mariana Trough: SeaMARCH II and Seismic Reflection Surveys," Journals of Geophysical Research, vol. 101, No. B5, May 10, 1996.

Ballantyne, J.; "Find and Catch More Fish, Quickly and Easily, with the FISHIN' BUDDY 2255"; [Online]; [Retrieved on Dec. 7, 2011]; Retrieved from the Internet URL:<http://www.articleslash.net/Recreation-and-Sports/Fishing/67018_Find-and-Catch-More-Fish-Quickly-and-Easily-with-the-FISHIN-BUDDY-2255.html>; 4 pages.

Berktay, H. O., et al.; "Farfield performance of parametric transmitters;" Journal of Acoustical Society of America, vol. 55, No. 3; dated Mar. 1974.

Blondel, Philippe; The Handbook of Sidescan Sonar; © 2009; 316 pages.

Calcutt, Ron; Lowrance Book of Sonar & GPS; © 1986; and Lowrance Book of Sonar & GPS Update; 1997; collectively 122 pages.

Carey, W.M., "Sonar Array Characterization, Experimental Results"; IEEE Journal of Oceanic Engineering ; vol. 23; Issue 3; Jul. 1998; pp. 297-306.

Cowie, P.A., et al., "Quantitative Fault Studies on the East Pacific Rise: A Comparison of Sonar Imaging Techniques," Journal of Geophysical Research, vol. 99, B8, Aug. 10, 1994.

Curcio, J., et al.; "SCOUT—A Low Cost Autonomous Surface Platform for Research in Cooperative Autonomy"; Department of Mechanical Engineering; Massachusetts Institute of Technology; Aug. 2005.

Derrow, II, Robert W. et al., A Narrow-Beam, Side-Looking Sonar for Observing and Counting Fish in Shallow Aquaculture Ponds; 1996; 34 pages.

De Jong, C. D., et al.; "Hydrography: Series on Mathematical Geodesy and Positioning;" VSSD; ISBN 90-407-2359-1; dated 2002.

Farrell, E.J.; , "Color Display and Interactive Interpretation of Three-Dimensional Data"; IBM Journal of Research and Development; vol. 27; No. 4; Jul. 1983; pp. 356-366.

Fried, N. W.; "An Investigation of a Large Step-Down Ratio Parametric Sonar and Its Use in Sub-Bottom Profiling;" Thesis: Simon Fraser University; dated Aug. 1992.

Glynn, Jr., J.M., et al.; "Survey Operations and Results Using a Klein 5410 Bathymetric Sidescan Sonar"; Retrieved from the Internet URL:<http://www.thsoa.org/hy07/03_04.pdf>; Mar. 2007.

Hansen, H.H.; "Circular vs. rectangular transducers"; Department of Electronics and Telecommunications; Norwegian University of Science and Technolgy; Mar. 2010; 28 pages.

Hardiman, J. E., et al.; "High Repetition Rate Side Looking Sonar;" Oceans 2002 MTSIEEE, vol. 4; dated Oct. 2002.

Hughes Clarke, J. E., et al.; Knudsen 320 200 kHz keel-mounted sidescan trials; Results from 2000/2001/2002 field operations; [online]; Retrieved on Jun. 23, 2010 from the Internet URL:<http://www.omg.unb.ca/Ksidescan/K320_SStrials.html>; 11 pages.

Hughes Clarke, J.E.; "Seafloor characterization using keel-mounted sidescan: proper compensation for radiometric and geometric distortion"; Canadian Hydrographic Conference; May 2004; 18 pages.

Wussong, D.M., et al., "High-Resolution Acoustic Seafloor Mapping," 20$^{th}$ Annual OTC, Houston, TX, May 2-5, 1988.

Jonsson, J., et al. "Simulation and Evaluation of Small High-Frequency Side-Scan Sonars using COMSOL"; Excerpt from the Proceedings of the COMSOL Conference; 2009; Milan, Italy.

Key, W.H.; "Side Scan Sonar Technology"; Oceans 2000 MTS/IEEE Conference and Exhibition; vol. 2; Sep. 2000; pp. 1029-1033.

Kielczynski, P., et al.; "Finite Element Method (FEM) and Impulse Response Method (IRM) analysis of circular and rectangular transducers"; 1995 IEEE Ultrasonics Symposium; 1995; pp. 693-696.

Klein, Martin; New Capabilities of Side Scan Sonar Systems; date unknown; pp. 142-147.

Klein, Martin; New Developments in Side Scan Sonar for Hydrography; date unknown; 14 pages.

Klein, Martin; Sea Floor Investigations Using Hybrid Analog/Digital Side Scan Sonar; date unknown; 18 pages.

Klein, Martin; Side Scan Sonar; Offshore Services; Apr. 1977, pp. 67, 68, 71, 72, 75.

Klein, Martin; Side Scan Sonar; UnderSea Technology; Apr. 1967; 4 pages.

Klein, M. et al., Sonar—a modern technique for ocean exploitation; IEEE Spectrum; Jun. 1968; pp. 40-46 and Authors page.

Kozak, G.; "Side Scan Sonar Target Comparative Techniques for Port Security and MCM Q-Route Requirements"; L-3 Communications; Klein Associates, Inc.; [Online]; Retrieved from the Internet URL:<http://www.chesapeaketech.com/techniques-port-security.pdf>; 11 pages.

Krotser, D.J., et al.; "Side-Scan Sonar: Selective Textural Enhancement"; Oceans'76; Washington, DC; Sep. 1976.

Kvitek, Rikk et al.; Final Report, Early Implementation of Nearshore Ecosystem Database Project Tasks 2 and 3; <http://seafloor.csumb.edu/taskforce/html%202% 20web/finalreport.htm>; Jul. 29, 1999; 92 pages.

Kvitek, R.G., et al.; "Victoria Land Latitudinal Gradient Project: Benthic Marine Habitat Characterization"; California State University; Monterey Bay; Field Report; Feb. 25, 2004.

Langeraar, W.; "Surveying and Charting of the Seas"; Elsevier Oceanography Series; vol. 37; Sep. 1983; p. 321.

Law, G., Sideways Glance, Side- and down-scan Imaging Open New Windows in Fishing Finding, Electronics, Nov. 2011, pp. 28-29.

Leonard, John L.; Cooperative Autonomous Mobile Robots; date unknown; 11 pages.

Manley, J.E., et al.; "Development of the Autonomous Surface Craft 'Aces'"; Oceans '97 MTS/IEEE Conference Proceedings; Oct. 1997; pp. 827-832.

Manley, J.E., et al.; "Evolution of the Autonomous Surface Craft 'AutoCat'"; Oceans 2000 MTS/IEEE Conference and Exhibition; vol. 1; Sep. 2000; pp. 403-408.

Melvin, G., et al.; Commercial fishing vessels, automatic acoustic logging systems and 3D data visualization; ICES; Journal of Marine Science; vol. 59; Issue 1; 2002; pp. 179-189.

Naoi, J., et al.; "Sea Trial Results of a Cross Fan Beam Type Sub-Bottom Profiler;" Japanese Journal of Applied Physics, vol. 39, No. 5; dated May 2000.

(56) References Cited

OTHER PUBLICATIONS

Newman, P.M.; "MOOS—Mission Orientated Operating Suite"; Department of Ocean Engineering; Massachusetts Institute of Technology; 2002.
Ollivier, F., et al.; "Side scan sonar using phased arrays for high resolution imaging and wide swath bathymetry"; IEEE Proceedings on Radar, Sonar and Navigation; vol. 143; Issue 3; Jun. 1996; pp. 163-168.
Oughterson, B., Sophisticated Sonar Reveals Detailed Images Recently Unimaginable. Is It Too Much too Soon?, Basic Instincts, pp. 75-78.
Plueddemann, A. J., et al.; "Design and Performance of a Self-Contained Fan-Beam ADCP;" IEEE Journal of Oceanic Engineering, vol. 26, No. 2; dated Apr. 2001.
Prickett, T.; "Underwater Inspection of Coastal Structures"; The REMR Bulletin; vol. 14; No. 2; Aug. 1997.
Pratson, L.F., et al.; "Introduction to advances in seafloor mapping using sidescan sonar and multibeam bathymetry data"; Marine Geophysical Research; Springer Netherlands; vol. 18; Issue 6; 1996; pp. 601-605.
Pryor, Donald E.; "Theory and Test of Bathymetric Side Scan Sonar"; Office of Charting and Geodetic Services; National Ocean Service; National Oceanic and Atmospheric Administration; Post 1987; pp. 379-384.
Riordan, J., et al.; "Implementation and Application of a Real-time Sidescan Sonar Simulator;" Oceans 2005—Europe, vol. 2; dated Jun. 2005.
Russell-Cargill, W.G.A. ed.; Recent Developments in Side Scan Sonar Techniques; © 1982; 141 pages.
Shono, K., et al.; "Integrated Hydro-Acoustic Survey Scheme for Mapping of Sea Bottom Ecology"; Ocean Research Institute; Tokyo, Japan; Nov. 2004.
Tokuyama, H. et al., *Principles and Applications of Izanagi Oceanfloor Imaging Sonar System*, Journal of the Japan Society of Photogrammetry and Remote Sensing, vol. 29, No. 2, 1990, pp. 76-83.
Trabant, Peter K.; Applied High-Resolution Geophysical Methods, Offshore Geoengineering Hazards; © 1984; 265 pages.
Trevorrow, M.V., et al.; "Description and Evaluation of a Four-Channel, Coherent 100-kHz Sidescan Sonar"; Defence R&D Canada-Atlantic; Dec. 2004.
Tritech International Limited; StarFish; 450H Hull-Mounted Sidescan System; date unknown; 2 pages.
Universal Sonar Limited; High Frequency Broad Band Line Array Type G27/300LQ; date unknown 2 pages.
Vaganay, J., et al.; "Experimental validation of the Moving Long Base-Line Navigation Concept"; 2004 IEEE/OES Autonomous Underwater Vehicles; Jun. 2004.
Vaneck, T.W., et al.; "Automated Bathymetry Using an Autonomous Surface Craft"; Journal of the Institute of Navigation; vol. 43; Issue 4; Winter 1996; pp. 329-334.
Waite, A.D.; "Sonar for Practising Engineers"; Third Edition; John Wiley & Sons, Ltd.; West Sussex, England; © 2002; 323 pages.
Williams, J. P., *Glancing Sideways, Nautical Know-How*, Chesapeake Bay Magazine, May 2011, pp. 14-17.
Yamamoto, F. et al., *Oceanfloor Imaging System—Izanagi*, Journal of the Japan Society for Marine Surveys and Technology 1 (2), Sep. 1989, pp. 45-51, 53 and 54.
Yang, L., et al.; "Bottom Detection for Multibeam Sonars with Active Contours;" MTSIEEE Conference Proceedings, vol. 2; dated Oct. 1997.
"100 W adjustable Wide-Beam: Transom-Mount Transducer—P48W;" Airmar Technology Corporation; <www.airmar.com>.
Alpine Geophysical Data Programmer Model 485C Brochure and letter dated Feb. 17, 1976; 2 pages.
Benthos C3D Sonar Imaging System; "High Resolution Side Scan Imagery with Bathymetry"; Benthos, Inc.; © May 2002.
Coastal Engineering Technical Note; "Side-Scan Sonar for Inspecting Coastal Structures"; U.S. Army Engineer Waterways Experiment Station; Revised Nov. 1983.
ConCAT Containerised Catamaran; Inshore hydrographic survey vessel that fits in a container; In Cooperation with Uniteam International; Kongsberg Simrad AS; Apr. 2004.
Communication [extended European Search Report] for European Application No. 05782717.2-2220 dated Aug. 31, 2011; 12 pages.
Communication for European Patent Application No. 05782717.2-2220 dated May 11, 2012; 9 pages.
Datasonics SIS-1000 Seafloor Imaging System; Combined Chirp Side Scan Sonar/Chirp Sub-Bottom Profiling for high resolution seafloor imaging; One System, All the Answers; Benthos, Inc.; © 2000.
Deep Vision Side Scan Sonar Systems; [Online]; [Retrieved on Dec. 2, 2011]; Retrieved from the Internet URL:<http://www.deepvision.se/products.htm>; 5 pages.
Detailed Sonar Transducer Product Information; Transducer Products; Side Scans; Models T36, T63, T62, and T403; Dec. 30, 2003; Retrieved from internet: URL: <http://www.neptune-sonar.com/products.as_btype=Side-Scan+Transducers&category=>; 4 pages.
DSME E&R LTD.; Remotely Operated Sonar Boat System (SB-100S); <http://dsmeu.en.ec21.com/Remotely_Operated_Sonar_Boat_System-618904_2479905.html>; printed on Feb. 12, 2010; 3 pages.
Eagle Electronics; Ultra 3D Installation and Operation Manual; © 2002; 24 pages.
EDO Corporation Global Technology Reach, Model 6400 Fan Beam Transducer; <http:/web/archive/org/web/20040608054923/www.edoceramic.con/NavDucers.htm>; Jun. 3, 2004.
EM1110-2-1003; Department of the Army; U.S. Army Corps of Engineers; Engineering and Design; Hydrographic Surveying; Apr. 1, 2004.
Extended European Search Report for Application No. 13153403.4; dated May 7, 2013.
U.S. Appl. No. 60/552,769, filed Mar. 12, 2004; Applicant: Terrence Schoreder.
Final Report; Early Implementation of Nearshore Ecosystem Database Project Tasks 2 and 3; [online]; Retrieved on Feb. 26, 2010 from the Internet URL:<http://seafloor.csumb.edu/taskforce/html%202%20web/finalreport.htm>; 90 pages.
Fishin' Buddy 4200™ Operations Manual; Dated Dec. 21, 2005; 16 pages.
FishFinder L265 Instruction Manual; Raymarine; 79 pages.
FishFinder L365 Instruction Manual; Raymarine; 83 pages.
FishFinder L470 Instruction Manual; Raymarine; 102 pages.
FishFinder L750 Instruction Manual; Raymarine; 93 pages.
Fishing Tool Reviews—Bottom Line Fishin Buddy 1200 Fishfinder; [Online]; [Retrieved on Dec. 7, 2011]; Retrieved from the Internet URL:<http://www.tackletour.com/reviewbottomline1200.html>; 4 pages.
Furuno Electric Co., Ltd.; Side Looking Sonar, Model SL-16, 1983; 4 pages.
GeoAcoustics; GeoPulse, Profiler System; Feb. 2006, 2 pages.
GeoAcoustics; A Kongsberg Company; GeoSwath Plus Brochure; "Wide swath bathymetry and georeferenced side scan"; [Online]; Retrieved from the internet URL:<http://www.km.kongsberg.com/ks/web/nokbg0397.nsf/AllWeb/F4B7FD3461368388C1257599002D34BC/$file/GeoSwath-Plus-brochure.pdf?OpenElement>.
GeoPulse; GeoAcoustics Pinger Sub-Bottom Profiler; Retrieved from the Internet URL:<http://www.km.kongsberg.com/ks/web/nokbg0397.nsf/AllWeb/D1084BB7DD0FD21DC12574C0003E01EA/$file/GeoPulse_Profiler.pdf?OpenElement>; GeoAcoustics Limited, UK; A Kongsberg Company.
GlobalMap Sport; Installation and Operation Instructions; Lowrance Electronics, Inc.; © 1996; 61 pages.
GPS Speed Correction; Sidescan Sonar; [online]; Retrieved from the Internet URL: <www.hydrakula.uni-kiel.de/downloads/Sidescan%20Sonar.doc>; 10 pages.
HUMMINBIRD 100 Series™ Fishin' Buddy®; 110, 120, 130 and 140c Product Manual; © 2007; 2 pages.
HUMMINBIRD 1197c Operations Manual; Nov. 6, 2007; 196 pages.
HUMMINBIRD 1198C Review for Catfishing, Catfishing "How to" Catfishing Techniques, Oct. 31, 2011, 9 pages.

(56) References Cited

OTHER PUBLICATIONS

HUMMINBIRD 200DX Dual Beam Operations Manual; 43 pages.
HUMMINBIRD 500 Series; 550, 560, 570 and 570 DI Operations Manual; © 2010; pp. 84.
Humminbird: America's favorite Fishfinder—the leading innovator of Side Imaging technology; [Online]; [Retrieved on Mar. 16, 2011]; Retrieved from the Internet URL: <http://www.humminbird.com/support/ProductManuals.aspx>; 20 pages.
HUMMINBIRD Dimension 3 Sonar 600 Operations Manual; 24 pages.
The HUMMINBIRD GPS Navigational System. Nothing Else Even Close.; HUMMINBIRD Marine Information Systems®; 1992; 10 pages.
HUMMINBIRD GPS NS. 10 Operations Manual; 75 pages.
HUMMINBIRD High Speed Transducer; 4 pages.
HUMMINBIRD LCR 400 ID Operations Manual; 28 pages.
HUMMINBIRD Marine Information Systems; Dimension 3 Sonar™; 1992; 16 pages.
HUMMINBIRD "Matrix 35 Fishing System," Prior to Aug. 2, 2003.
HUMMINBIRD Matrix 35 Fishing System; 2 pages.
HUMMINBIRD Matrix 55 and 65 Operations Manual; © 2003; 40 pages.
HUMMINBIRD Matrix 67 GPS Trackplotter Operations Manual; © 2003; 88 pages.
HUMMINBIRD "Matrix 97 GPS Trackplotter Operations Manual" 2003.
HUMMINBIRD Matrix 97 Operations Manual; © 2003; 87 pages.
HUMMINBIRD Matrix™ 87c Operations Manual; © 2004; 45 pages.
HUMMINBIRD The New Wave of Wide; 1997; HUMMINBIRD WIDE®; fish wide open!®; 24 pages.
HUMMINBIRD NS25 Operations Manual; 71 pages.
HUMMINBIRD Piranha 1 & 2 Operation Guide; 5 pages.
HUMMINBIRD Platinum ID 120 Operations Manual; 36 pages.
HUMMINBIRD Platinum ID 600 Operations Manual; 18 pages.
HUMMINBIRD "The Product Line>Matrix Products>Matrix 35" <http://web.archive.org/web/20030404000447/www.humminbird.com/hb_Products.asp?ID>, Apr. 4, 2003.
Humminbird® Trolling Motor Mounted Transducer with Mount Assembly Brochure; © 2008 Humminbird®, Eufaula, AL; 2 pages.
HUMMINBIRD Wide 3D Paramount Operations Manual; 44 pages.
HUMMINBIRD Wide 3D View Operations Manual; 38 pages.
HUMMINBIRD Wide 3D Vision Operations Manual; 38 pages.
HUMMINBIRD Wide 3D Vista Operations Manual; 38 pages.
HUMMINBIRD Wide Eye Operations Manual; 32 pages.
HUMMINBIRD Wide Paramount Operations Manual; fish wide open!; 32 pages.
HUMMINBIRD "Wideside"; Schematic; Dec. 15, 1994; 5 pages.
Hydro Products; A Tetra Tech Company; 4000 Series Gifft Precision Depth Recorder Product Brochure; date stamped 1977.
The Hydrographic Society—Corporate Member News—Kongsberg SIMRAD; Jul. 3, 2008; 7 pages.
Imagenex Model 855 Brochure: Online; Documents retrieved from internet web archives as follows: URL:<http://web.archive.org/web/20021023212210/http:/www.imagenex.com/Products/855_858/855₁₃ 858.html>; 1 page; Archived on Oct. 23, 2002, URL:http://web.archive.org/web/20021024124035/http:/www.imagenex.com/Products/855_858/855.html; 1 page; Archived on Oct. 24, 2002, URL:<http://web.archive.org/web/20021024125254/http:/www.imagenex.com/Products/855_858/858/858.html>; 1 page; Archived on Oct. 24, 2002, URL:<http://web.archive.org/web/20030424071306/http:/www.imagenex.com//855_Page_1.jpg>; 1 page; Archived on Apr. 24, 2003, URL:<http://web.archive.org/web/20030424091547/http:/www.imagenex.com/855_Page_2.jpg>; 1 page; Archived on Apr. 24, 2003, URL:<http://web.archive.org/web/20030424094158/http:/www.imagenex.com/855_Page_3.jpg>; 1 page; Archived on Apr. 24, 2003, URL:<http://web.archive.org/web/20030424101301/http:/www.imagenex.com/855_Page_4.jpg>; 1 page; Archived on Apr. 24, 2003, URL:<http://web.archive.org/web/20030424101939/http:/www.imagenex.com/855_Page_5.jpg>; 1 page; Archived on Apr. 24, 2003, URL:<http://web.archive.org/web/20030424135458/http:/www.imagenex.com/855_Page_6.jpg>; 1 page; Archived on Apr. 24, 2003, URL:<http://web.archive.org/web/20030424141232/http:/www.imagenex.com/855_Page_7.jpg>; 1 page; Archived on Apr. 24, 2003, URL:<http://web.archive.org/web/20030424143158/http:/www.imagenex.com/855_Page_8.jpg>; 1 page; Archived on Apr. 24, 2003.
Imagenex Model 872 "Yellowfin" Sidescan Sonar; Imagenex Technology Corp.; © 2004-2009; 107 pages.
The Imagenex SportScan; Digital Sidescan Sonar; "Redefining Image Clarity"; Imagenex Technology Corp.; © 2002; 4 pages.
Imagenex SportScan Digital SideScan Sonar Brochure: Online; Documents retrieved from internet web archives as follows: URL:<http://web.archive.org/web/20030212030409/http://www.imagenex.com/Products/products.html>; 1 page; Archived on Feb. 12, 2003, URL:<http://web.archive.org/web/20030214044915/http://www.imagenex.com/Products/SportScan/sportscan.html>; 1 page; Archived on Feb. 14, 2003, URL:<http://web.archive.org/web/20030222152337/http://www.imagenex.com/Products/SportScan/SportScan_Specs/sportscan_specs.html>; 3 pages; Archived on Feb. 22, 2003, URL:<http://web.archive.org/web/20030222161450/http://www.imagenex.com/Products/SportScan/FAQ_s/faq_s.html>; 4 pages; Archived on Feb. 22, 2003, URL:<http://web.archive.org/web/20030419024526/http://www.imagenex.com/Products/SportScan/distributors.html>; 2 page; Archived on Apr. 19, 2003.
IMAGENEX (Various) Technical Specifications and User's Manual; Prior to Aug. 2003; 3 pages.
IMAGENEX Technology Corp., Model 881 SportScan, Single or Dual Frequency Digital Sidescan Sonar, Software User's Manual; May 9, 2003; 16 pages.
IMAGENEX Technology Corp.; YellowFin SideScan Sonar, (Model 872); user's manual; data storage file format; Ethernet interface specification, and Ethernet setup guide; Nov. 2004; 46 pages.
"*Improved sidescan performance on Lowarance LSS1*;" Dr.Depth: Sea bottom mapping software; retrieved on Oct. 5, 2011 from <http:www.dr.depth.se/rdfour.php?1=gb>.
Innomar—Products; "System Variants: SES Side Scan Option"; Retrieved from Internet URL:<http://www.innomar.com/produ_2000sidescan.htm>; Dec. 30, 2003; 2 pages.
International Search Report for Application No. PCT/US05/27436 dated Nov. 20, 2007; 1 page.
International Preliminary Report on Patentability for Application No. PCT/US05/27436 dated Dec. 6, 2007; 5 pages.
International Search Report and Written Opinion for Application No. PCT/US2010/039441 dated Oct. 11, 2010.
International Search Report and Written Opinion for Application No. PCT/US2010/039443 dated Oct. 6, 2010.
"ITC Application Equations for Underwater Sound Transducers"; Published by International Transducer Corporation, 1995, Rev. 8/00; 3 pages.
Kelvin Hughes Transit Sonar; ". . . a new dimension in shallow water survey to assist in . . . "; Hydrography; Dredging; Salvage; Underwater Construction and Similar Works; Mar. 1966; 8 pages.
Klein Associates, Inc.; Modular Side Scan Sonar and Sub-Bottom Profiler System Components for Customized Configurations; date unknown; 10 pages.
Klein Digital Sonar Systems, ". . . The Next Generation From the World Leader in Side Scan Sonar and Sub-bottom Profiling Systems," 1988; 11 pages.
Kongsberg Brochure EA 400 Survey; "A complete, integrated survey system"; Kongsberg Maritime AS; Oct. 2003; 4 pages.
Kongsberg Brochure EA 400/600 "Sidescan Echo sounder with combined sidescan and depth soundings"; Kongsberg Maritime AS; May 2004; 3 pages.
Kongsberg Maritime AS; Side Looking Transducer, 200 kHz—0.5×49, 200 kHz side looking transducer for shallow water and surveying and high resolution; date unknown; 2 pages.
Kongsberg SIMRAD AS; ConCat Containerised Catamaran, Inshore hydrographic survey vessel that fits in a container, Rev. B, Apr. 2004; 4 pages.
Lowrance HS-3DWN Transducer Assembly and Housing (Eagle IIID); Aug. 1994; 6 pages.

(56) References Cited

OTHER PUBLICATIONS

Lowrance LCX-18C & LCX-19C Fish-finding Sonar & Mapping GPS; Operation Instructions; © 2002; 200 pages.
Lowrance Transducers Product Information; 1 page.
Marine Acoustics Society of Japan, Ed.; "Basics and Application of Marine Acoustics"; Apr. 28, 2004; pp. 152-172.
Maritime surveys takes delivery of SeaBat 8160; Sea Technology, Jul. 2001; <http://findarticles.com/p/articles/mi_qa5367/is_200107/ai_n21475675/>; website printed Jun. 30, 2010.
Marine Sonic Technology, Ltd.; Sea Scan® PC Side Scan Sonar System Information/Specifications Sheet; Sep. 9, 2002; 10 pages.
Mesotech; Mesotech Model 971 Sonar System Summary; Mar. 26, 1985, 2 pages.
Navico Design Report of Raytheon Electronics Side Looker Transducer; Mar. 12, 2010; 18 pages.
NOAA: Nautical Charting general information from public records; [Online]; Retrieved on Sep. 10, 2010 from the Internet URL: <http://www.nauticalcharts.noaa.gov/csdl/learn_hydroequip.html>; 2 pages; <http://www.nauticalcharts.noaa.gov/csdl/learn_hydroequip.html>; 1 page; <http://www.nauticalcharts.noaa.gov/csdl/PDBS.html>; 2 pages; <http://www.nauticalcharts.noaa.gov/hsd/pub.html>; 1 page; <http://www.nauticalcharts.noaa.gov/hsd/fpm/fpm.htm>; 1 page; <http://www.ozcoasts.gov.au/geom_geol/toolkit/Tech_CA_sss.jsp>; 12 pages.
Office Action for European Application No. 10728530.6; dated Apr. 2, 2013.
Office Action for European Application No. 10729001.7; dated Apr. 5, 2013.
Office Action for Reexamination No. 90/009,956; dated Apr. 6, 2012; 32 pages.
Office Action for Reexamination No. 90/009,957; dated Jun. 4, 2012; 17 pages.
Office Action for Reexamination No. 90/009,958; dated Jun. 18, 2012; 19 pages.
Office Action for U.S. Appl. No. 11/195,107; dated Feb. 15, 2007; 5 pages.
Office Action for U.S. Appl. No. 11/195,107; dated Aug. 9, 2007; 7 pages.
Office Action for U.S. Appl. No. 11/195,107; dated Mar. 4, 2008; 7 pages.
Office Action for U.S. Appl. No. 11/195,107; dated Jul. 17, 2008; 7 pages.
Office Action for U.S. Appl. No. 11/195,107; dated May 12, 2009; 9 pages.
Office Action for U.S. Appl. No. 12/319,594; dated Jun. 8, 2009; 10 pages.
Office Action for U.S. Appl. No. 12/319,586; dated Sep. 3, 2009; 5 pages.
Office Action for U.S. Appl. No. 12/319,586; dated Mar. 2, 2010; 5 pages.
Office Action for U.S. Appl. No. 12/319,604; dated Sep. 29, 2009; 7 pages.
Office Action for U.S. Appl. No. 12/631,229; dated Sep. 9, 2010, 8 pages.
ONR Grant N66604-05-1-2983; Final Report; "Cooperative Autonomous Mobile Robots"; Retrieved from the Internet URL:<http://dodreports.com/pdf/ada463215.pdb>; Post 2006.
Odom Echoscan™: For Sea Floor or Riverbed Surveys; Odom Hydrographic Systems; Apr. 26, 2002; 2 pages.
Odom Hydrographic Systems ECHOSCAN Manual; Revision 1.11; Apr. 26, 2002.
"Product Survey Side-Scan Sonar"; Hydro International Magazine; vol. 36; Apr. 2004; pp. 36-39.
R/V Quicksilver; Hydrographic Survey Launch Bareboat or Crewed; F/V Norwind, Inc.
R/V Tangaroa; Fact Sheet; Explore lost worlds of the deep; Norfanz Voyage; May 10 to Jun. 8, 2003.
Raymarine, L750 Fishfinder, Operation Handbook; date unknown; 93 pages.
Raytheon Marine Company; Installation Instructions; Oct. 1998; 2 pages.
Remtechsroy Group; Side Scan Sonar-Remotely Operated Vehicle Surface; <http://remtechnology.en.ec21.com/Side_Scan_Sonar_Remotely_Operated-2902034_2902230.html>; printed on Feb. 12, 2010; 4 pages.
RESON Inc.; SeaBat 8101 Product Specification, 240kHz Multibeam Echo Sounder; © 1999; 2 pages.
RESON; SeaBat 8101; Multibeam acoustic echosounder; date unknown; 1 page.
RESON; SeaBat 8160 Product Specification, Multibeam Echosounder System; date unknown; 2 pages.
Response to European Search Report for European Patent Application No. 05782717.2-2220; dated Mar. 23, 2012; Johnson Outdoors, Inc.; 35 pages.
SeaBat 8101 Product Specification; 240kHz Multibeam Echo Sounder; © 1999 RESON Inc.; Version 4.0; 6 pages.
Search Report for European Application No. 12195752.6; dated Mar. 7, 2013.
Sidefinder—Reviews & Brand Information—Techsonic Industries, Inc.; [Online]; [Retrieved on Dec. 7, 2011]; Retrieved from the Internet URL:<http://www.trademarkia.com/sidefinder-74113182.html>; 3 pages.
SIMRAD; Product Specifications, Simrad EA 500 Side-looking Option; Feb. 1992, 1 page.
SIMRAD EA 500; Hydrographic Echo Sounder; Product Specifications; Revision: Sep. 1993.
SonarBeam Underwater Surveying System Using T-150P tow-fish hull mounted; [Online]; [Retrieved on Feb. 12, 2010 from the Internet URL: <http://dsmeu.en.ec21.com/Remotely_Operated_Sonar_Boat_System--618904_2479905.html>; 4 pages; <http://www.remtechnology.en.ec21.com/Side_Scan_Sonar_Remotely_Operated--2902034.html>; 4 pages; [Retrieved on Feb. 16, 2010 from the Internet URL: <http://dsmeu.en.ec21.com/Remotely_Operated_Sonar_Boat_System--618904_2479905.html>; 4 pages; <http://www.remtechnology.en.ec21.com/Side_Scan_Sonar_Remotely_Operated--2902230.html>; 7 pages.
Sonar Theory and Applications; Excerpt from Imagenex Model 855 Color Imaging Sonar User's Manual; Imagenex Technology Corp.; Canada; 8 pages.
Starfish 450H; Sidescan System; Tritech International Limited; UK.
T297-00-01-01 Transducer housing outline drawing; Neptune Sonar Ltd.; © 2002.
Techsonic Industries, Inc., Humminbird Wide fish wide open!; brochure, 1997; 4 pages.
Techsonic Industries, Inc.; Humminbird GPS brochure; © 1992; 10 pages.
Techsonic Industries, Inc.; "Mask, Acoustic"; Schematic, May 24, 1996.
Techsonic Industries, Inc.; "Element, 455 kHz"; Schematic, Jun. 13, 1996.
Teleflex Electronic Systems; Humminbird 1997; © 1996; 24 pages.
The Norwegian and Finnish navies performing operations with the Kongsberg Hugin AUV and minesniper mine disposal vehicle in Finnish waters; FFU nytt; No. 3, Nov. 2003; p. 12.
Trademark Electronic Search System (TESS); Word Mark: Sidefinder; [Online]; [Retrieved on Dec. 7, 2011]; Retrieved from the Internet URL:<http://tess2.uspto.gov/bin/showfield?f=doc&state=4009:qi4jkj.2.1>; 2 pages.
"Transducers Quad Beam," Prior to Aug. 2, 2003; 1 page.
Translation of Notice of Reason(s) for Rejection for Japanese Application No. 2007-524919 dated Aug. 16, 2011; 4 pages.
U-Tech Company Newsletter; 1 page.
Ultra III 3D Installation and Operation Instructions; EAGLE™; © 1994.
USACE, "Chapter 11, Acoustic Multibeam Survey Systems for Deep-Draft Navigation Projects," Apr. 1, 2004.
Westinghouse Publication; "Side-Scan Sonar Swiftly Surveys Subsurface Shellfish"; May 1970; 4 pages.
International Search Report and Written Opinion for Application No. PCT/US2012/046062 dated Dec. 14, 2012.
Office Action for Japanese Application No. 2012-267270 dated Dec. 2, 2013.

(56) References Cited

OTHER PUBLICATIONS

HUMMINBIRD WIDE Optic Operations Manual 1997; fish wide open!: 32 pages.
HUMMINBIRD WIDE Brochure 1997; fish wide open!; 4 pages.
HUMMINBIRD 997c SI Combo Installation and Operations Manual 2008; 151 pages.
HUMMINBIRD 757c, 787c2 and 757c2i GPS Chartplotter Operations Manual 2006; 161 pages.
Lowrance Electronics, Inc.; X-70A 3D Installation and Operation Instructions; 44 pages.
Raymarine: DSM25 Digital Sounder Module Owner's Handbook; 62 pages.
Raymarine: A65 GPS Chartplotter Owners Handbook; © Raymarine 2006; 100 pages.
Raymarine: E-series Networked Display: Reference Manual; Mar. 2006; 51 pages.
Kongsberg Publication; Pohner, Freddy et al.; Integrating imagery from hull mounted sidescan sonars with multibeam bathymetry: 16 pages.
Airmar Technology Corporation, R209 Dual Frequency 2 to 3W Transducer; Oct. 10, 2007; 2 pages.
Airmar Technology Corporation, R99 Dual Frequency 2kW Transducer; May 2, 2006; 2 pages.
DeRoos, Bradley G. et al., Technical Survey and Evaluation of Underwater Sensorsand Remotely Operated Vehicles; May 1993; 324 pages.
Klein Associates, Inc., Klein Hydroscan System, 1983; 52 pages.
Office Action for Japanese Application No. 2013-037874 dated Mar. 26, 2014.
Petition for Inter Partes Review of U.S. Pat. No. 8,305,840; IPR2013-00355; dated Jun. 13, 2013; Raymarine, Inc.; 63 pages.
Declaration of Paul Stokes for Inter Partes Review of U.S. Pat. No. 8,305,840; IPR2013-00355; dated Jun. 12, 2013; Raymarine, Inc.; 118 pages.
Patent Owner's Preliminary Response; Inter Partes Review of U.S. Pat. No. 8,305,840; IPR2013-00496 ; dated Sep. 17, 2014; Navico Holding AS; 114 pages.
Decision for Inter Partes Review of U.S. Pat. No. 8,305,840; IPR2013-00355; dated Dec. 12, 2013; United States Patent and Trademark Office; 36 pages.
Judgment of Inter Partes Review of U.S. Pat. No. 8,305,840; IPR2013-00355; dated Mar. 25, 2014; United States Patent and Trademark Office; 3 pages.
Petition for Inter Partes Review of U.S. Pat. No. 8,305,840; IPR2013-00496; dated Aug. 6, 2013; Raymarine, Inc.; 63 pages.
Declaration of Paul Stokes for Inter Partes Review of U.S. Pat. No. 8,305,840; IPR2013-00496; dated Aug. 2, 2013; Raymarine, Inc.; 124 pages.
Patent Owner's Preliminary Response; Inter Partes Review of U.S. Pat. No. 8,305,840; IPR2013-00355; dated Sep. 17, 2014; Navico Holding AS; 110 pages.
Decision for Inter Partes Review of U.S. Pat. No. 8,305,840; IPR2013-00496; dated Feb. 11, 2014; United States Patent and Trademark Office; 14 pages.
Judgment of Inter Partes Review of U.S. Pat. No. 8,305,840; IPR2013-00496; dated Mar. 25, 2014; United States Patent and Trademark Office; 3 pages.
Petition for Inter Partes Review of U.S. Pat. No. IPR2013-00497; dated Aug. 6, 2013; Raymarine, Inc.; 64 pages.
Declaration of Paul Stokes for Inter Partes Review of U.S. Pat. No. 8,305,840; IPR2013-00497; dated Aug. 2, 2013; Raymarine, Inc.; 166 pages.
Patent Owner's Preliminary Response; Inter Partes Review of U.S. Pat. No. 8,305,840; IPR2013-00497; dated Sep. 17, 2014; Navico Holding AS; 102 pages.
Decision for Inter Partes Review of U.S. Pat. No. 8,305,840; IPR2013-00497; dated Feb. 11, 2014; United States Patent and Trademark Office; 17 pages.
Judgment of Inter Partes Review of U.S. Pat. No. 8,305,840; IPR2013-00497; Mar. 25, 2014; United States Patent and Trademark Office; 3 pages.
Supplemental Response to second set of Interrogatories; International Trade Commission; Investigation No. 337-TA-898; dated Jan. 6, 2014; Raymarine, Inc.; 12 pages.
Invalidity Contention; U.S. Pat. No. 8,305,840 Invalidity Claim Chart; Exhibit A01—Hydrography; Feb. 12, 2014; 30 pages.
Invalidity Contention; U.S. Pat. No. 8,305,840 Invalidity Claim Chart; Exhibit A02—Hydrography, Lustig; Feb. 12, 2014; 42 pages.
Invalidity Contention; U.S. Pat. No. 8,305,840 Invalidity Claim Chart; Exhibit A03—Hydrography, Adams; Feb. 12, 2014; 49 pages.
Invalidity Contention; U.S. Pat. No. 8,305,840 Invalidity Claim Chart; Exhibit A04—Hydrography, Boucher '522; Feb. 12, 2014; 39 pages.
Invalidity Contention; U.S. Pat. No. 8,305,840 Invalidity Claim Chart; Exhibit A05—Hydrography, Boucher '522, Adams; Feb. 12, 2014; 54 pages.
Invalidity Contention; U.S. Pat. No. 8,305,840 Invalidity Claim Chart; Exhibit A06—Hydrography, Adams, Betts; Feb. 12, 2014; 29 pages.
Invalidity Contention; U.S. Pat. No. 8,305,840 Invalidity Claim Chart; Exhibit A07—Hydrography, Boucher '522, Adam, Betts; Feb. 12, 2014; 33 pages.
Invalidity Contention; U.S. Pat. No. 8,305,840 Invalidity Claim Chart; Exhibit A08—Hydrography, Boucher '798, DeRoos, Adams; Feb. 12, 2014; 46 pages.
Invalidity Contention; U.S. Pat. No. 8,305,840 Invalidity Claim Chart; Exhibit A09—Hydrography, Boucher '798, DeRoos, Adams, Betters; Feb. 12, 2014; 33 pages.
Invalidity Contention; U.S. Pat. No. 8,305,840 Invalidity Claim Chart; Exhibit A10—Furuno; Feb. 12, 2014; 58 pages.
Invalidity Contention; U.S. Pat. No. 8,305,840 Invalidity Claim Chart; Exhibit A11—Airmar P48; Feb. 12, 2014; 70 pages.
Invalidity Contention; U.S. Pat. No. 8,305,840 Invalidity Claim Chart; Exhibit A12—Russell-Cargill et al; Feb. 12, 2014; 89 pages.
Invalidity Contention; U.S. Pat. No. 8,305,840 Invalidity Claim Chart; Exhibit A13—Kongsberg EA 400/600; Feb. 12, 2014; 57 pages.
Invalidity Contention; U.S. Pat. No. 8,305,840 Invalidity Claim Chart; Exhibit A14—Sato; Feb. 12, 2014; 6 pages.
Invalidity Contention; U.S. Pat. No. 8,305,840 Invalidity Claim Chart; Exhibit A15—Chiang, E-Series; Feb. 12, 2014; 5 pages.
Invalidity Contention; U.S. Pat. No. 8,305,840 Invalidity Claim Chart; Exhibit A16—Bird, Wilcox, Nishimori, Hamada, Blue, Fatemi-Boosheri, Boucher '798, Thompson, Betts, Zimmerman, P48, Tri-Beam, Imagenex, Odom Echoscan; Feb. 12, 2014; 40 pages.
Invalidity Contention; U.S. Pat. No. 8,305,840 Invalidity Claim Chart; Exhibit A17—Hydrography, Humminbird 997c, Betts; Feb. 12, 2014; 69 pages.
Invalidity Contention; U.S. Pat. No. 8,305,840 Invalidity Claim Chart; Exhibit A18—Humminbird 997c; Feb. 12, 2014; 83 pages.
Invalidity Contention; U.S. Pat. No. 8,305,840 Invalidity Claim Chart; Exhibit A19—Betts; Feb. 12, 2014; 49 pages.
Invalidity Contention; U.S. Pat. No. 8,300,499 Invalidity Claim Chart; Exhibit B01—Tri-Beam; Feb. 12, 2014; 31 pages.
Invalidity Contention; U.S. Pat. No. 8,300,499 Invalidity Claim Chart; Exhibit B02—Hydrography, Humminbird 757 c; Feb. 12, 2014; 38 pages.
Invalidity Contention; U.S. Pat. No. 8,300,499 Invalidity Claim Chart; Exhibit B03—Airmar-R209, Humminbird 757 c; Feb. 12, 2014; 43 pages.
Invalidity Contention; U.S. Pat. No. 8,300,499 Invalidity Claim Chart; Exhibit B04—Airmar-R209, Hydrography, Humminbird 757c, Sato, Aimar-R99, Zimmerman; Feb. 12, 2014; 59 pages.
Invalidity Contention; U.S. Pat. No. 8,300,499 Invalidity Claim Chart; Exhibit B05—Odom Echoscan; Feb. 12, 2014; 45 pages.
Invalidity Contention; U.S. Pat. No. 8,300,499 Invalidity Claim Chart; Exhibit B06—Kongsberg EA 400/600; Feb. 12, 2014; 37 pages.
Invalidity Contention; U.S. Pat. No. 8,300,499 Invalidity Claim Chart; Exhibit B07—Nishimori, Thompson, Betts, Zimmerman, Melvin, Tri-Beam, Odom Echoscan; Feb. 12, 2014; 22 pages.

(56) References Cited

OTHER PUBLICATIONS

Invalidity Contention; U.S. Pat. No. 8,300,499 Invalidity Claim Chart; Exhibit B08—Hydrography, Betts et al, Humminbird 997c and 757c; Feb. 12, 2014; 61 pages.
Invalidity Contention; U.S. Pat. No. 8,300,499 Invalidity Claim Chart; Exhibit B09—Humminbird 997c; Feb. 12, 2014; 40 pages.
Invalidity Contention; U.S. Pat. No. 8,300,499 Invalidity Claim Chart; Exhibit B10—Betts; Feb. 12, 2014; 29 pages.
Supplemental Response to Interrogatories, Exhibit 1; International Trade Commission; dated Feb. 28, 2014; Navico Holding AS.; 114 pages.
Supplemental Response to Interrogatories, Exhibit 2; International Trade Commission; dated Feb. 28, 2014; Navico Holding AS.; 67 pages.
Clausner, J.E. and Pope, J., 1988. "Side-scan sonar applications for evaluating coastal structures"; U.S. Army Corps of Engineers, Technical Report CERC-88-16; 80 pages.
Garmin; GPSMAP® 4000/5000 Series, Owner's Manual; 2007; 54 pages.
Hare, M.R., "Small-Boat Surveys in Shallow Water", 2008 Institute of Ocean Sciences, Marine habitat mapping Technology for Alaska; 19 pages.
Hayes, M.P. and Ho, T.Y., 2000. "Height estimation of a sonar towfish from sidescan imagery", Hamilton: Proc. Image Vision Computing New Zealand; 6 pages.
HUMMINBIRD 1100Series Operations Manual; © 2007; 196 pages.
Imagenex Technology Corp., Model 881 Digital Tilt Adjust Imaging Sonar; Hardware Specifications; Aug. 12, 2002; 3 pages.
Klein Associates, Inc.; 1985, "Side Scan Sonar Training Manual", Side Scan Sonar Record Interpretation; 151 pages.
Mazel, C. H., 1984 "Inspection of Surfaces by Side-Scan Sonar," ROV '84 Remotely Operated Vehicle Conference of the Marine Technology Society, 7 pages.
SOLAS Chapter V; Safety of Navigation, Jul. 1, 2002; [Online]; Retrieved from the Internet URL:https://www.gov.uk/government/uploads/system/uploads/attachment_data/file/343175/solas_v_on_safety_of_navigation.pdf.
Tucker, M. J., and Stubbs, A. R., "Narrow-beam echo-ranger for fishery and geological investigations", British Journal of Applied Physics vol. 12:3 pp. 103-110 (1961).
Montgomery, E.T., et al., "Documentation of the U.S. Geological Survey Oceanographic Time-Series Measurement Database", USGS Open-File Report 2007-1194; 2 pages.
WESMAR; 500SS Sidescan Brochure; Feb. 1985; 2 pages.
WESMAR; 500SS Side Scan Brochure; May 1998; 2 pages.
WESMAR; 500SS Side Scan Owner's Manual; 82 pages.
WESMAR; SHD 700SS; "Super High Definition Side Scan Sonar with Color Video Display Capability", Operations Manual, May 1998, 45 pages.
WESMAR; SHD700SS Super High Definition Side Scan Sonar; date unknown; 4 pages.
Wilson, D., "Side Scan Sonar: The Key to Underwater Survey", Flinders Archaeology Blog, Oct. 25, 2011, 4 pages.
Layton, J., Strickland, J., Bryant, C.W., How Google Earth Works, HowStuffWorks, Mar. 25, 2010, 2 pages; [Online]; Retrieved from Internet URL: http://wayback.archive.org/web/20100425042606/http://computer.howstuffworks.com/internet/basics/google-earth7.htm.
PCT International Search Report and Written Opinion; PCT/IB2013/060285; Feb. 18, 2014.
PCT International Search Report and Written Opinion; PCT/US2013/047869; Oct. 21, 2013.
PCT International Search Report and Written Opinion; PCT/US2013/048177; Oct. 21, 2013.
PCT International Search Report and Written Opinion; PCT/US2013/048129; Oct. 17, 2013.
PCT International Search Report and Written Opinion; PCT/US2013/047926; Oct. 11, 2013.
PCT International Search Report and Written Opinion; PCT/US2013/047645; Sep. 27, 2013.
Airmar Press Release: *Airmar Introduces P48W 200kHz Adjustable, Wide-Beam, Trasom-Mount: Industry's widest 200 kHz transducer can help win fishing tournaments* (Apr. 23, 2009).
Airmar Technology Corporation Brochure/Presentation: Guide to Transducer Technology (Aug. 18, 2010).
Airmar Technology Corporation Datasheet: P48W Transom-Mount Adjustable Wide-Beam, (Dec. 2010).
Owner's Guide & Installation Instructions, Transam or Tolling Motor Mount, Chirp or Adjustable Wide-beam Transducer, Models: P48W, TM130M, TM150M, TM210H (2013).
Airmar Technology Corporation Brochure DST800 Retractable Transducer System Sep. 2005.
Garmin GPSMAP 3206/3210 Color Chartplotter Owner's Manual (Jun. 2006).
GeoAcoustics, GeoSwath Operation Manual Swath 6100/B (Sep. 1998).
GeoAcoustics, GeoSwath Product Bulletin (2000).
Hogarth, P., Low Cost Swath Bathymetry: Widening the swath bathymetry market, Hydro International (Jul. 2000).
Datasheet / Specification for Imagenex Sportscan, (Aug. 2005).
Imagenex Model 858 User's Manual (May 1999).
Imagenex MOdel 855 User's Manual (Nov. 1991).
Imagenex Sportscan Installation / Setup Manual (date unknown).
Product News, Versatile Side-Scan Sonar: JW Fishers developed a side-scan towfish with adjustable transducers, Hydro International, (Feb. 2008) http://.hydro-international.com/news/id2531-VersatileSidescanSonar.html.
Side Scan PC Operation Manual: SSS-100k PC, SSS-600 PC, SSS-100k/600K PC Side Scan Sonar Operation and Maintenance Manual, JW Fishers MFG Inc (date unknown).
Klein Associates Brochure: Hydroscan for Pipeline Survey (date unknown).
Klein Associates Brochure: Klein Smartfish, A Proven Platform for Deep Tow Applications (date unknown).
Klein Associates Brochure: System 3900—Dual-Frequency Side Scan Sonar for Search and Recovery (Nov. 2008).
Klein Associates Product Catalog Supplement: Sub-Bottom Profiler & Microprofiler (Supplement to HYDROSCAN catalog) (Nov. 1983).
Klein Hydroscan Applications Bulletin: Oil and Gas Pipeline Routing, Laying and Inspection, (Jan. 1983).
Kucharski, William M., and Clausner, James E., Underwater Inspection of Coastal Structures Using Commercially Available Sonars, Technical Report REMR-CO-11, US Army Corps of Engineers, Department of the Army (Feb. 1990).
Mazel, Charles H., Inspection of Surfaces by Side Scan Sonar, Proceedings of the Remotely Operated Vehicles Conference and Exposition, (1984).
EA 400/600 Sidescan: Echo Sounder with Combined Sidescan and Depth Soundings, Konigsberg Maritime AS, (Nov. 2005).
SIMRAD EK 500 Fishery Research Echo Sounder Installation Manual (Jun. 2006).
SIMRAD EK 500 Fishery Research Echo Sounder Operator Manual (May 1996).
Avera W., et al., Multibeam Bathymetry from a Mine-Hunting Military Sonar, Report No. NRL/JA/7440-02-1010, Naval Research Laboratory and Naval Oceanographic Office, (Nov. 2002).
Barbu, Madalina, "Acoustic Seabed and Target Classification using Fractional Fourier Transform and Time-Frequency Transform Techniques" Dissertation Paper 480, University of New Orleans (2006).
Barbu, C., et al., AQS-20 Sonar Processing Enhancement for Bathymetry Estimation, pp. 1-5, Presented at OCEANS Conference (2005).
Buchannan, H.L. and Lt. Cmdr. John M. Cottingham, Countering Mines in 2005, Sea Technology, vol. 41, No. 1, pp. 24-29, (Jan. 2000).
Elmore, P.A., et al., Environmental Measurements Derived from Tactical Mine Hunting Sonar Data, pp. 1-5, Presented at OCEANS Conference (2007).
Elmore, P.A. et al., Use of the AN/AQS-20A Tactical Mine-hunting System for On-scene Bathymetry Data, Journal of Marine Systems, vol. 78, pp. 5425-5432(Feb. 2008).

(56) References Cited

OTHER PUBLICATIONS

Gallaudet, T.C., et al., Multibeam Volume Acoustic Backscatter Imagery and Reverberation Measurements in the Northeastern Gulf of Mexico, J. Acoust. Soc. Am., vol. 112, No. 2, pp. 489-503 (Aug. 2002).
Harris, M.M. et al., Tow Vehicle Depth Verification, Oceans 2002 IEEE/MTS Conference Proceedings, pp. 1199-1202 (Oct. 2002).
Streed, C.A. et al., AQS-20 Through-The-Sensor Environmental Data Sharing, Proceedings of the SPIE Defense & Security Symposium (Mar. 2005).
Taylor, W.A., et al., Taking the Man out of the Minefield, Sea Technology 2007, vol. 48, No. 11, pp. 15-19 (Nov. 2007).
Kelly, D., The Scoop on Scanning Sonar, Motor Boating and Sailing, pp. 51, 70-71 (Aug. 1976).
Sosin, M., Can Electronics Make You Almost as Smart as a Fish, Popular Mechanics, pp. 110-111 (Nov. 1976).
WESMAR Brochure: Wesmar's New HD800 Sonar (date unknown).
Wesmar Sonar Effective in Shallow-Water Operations Literature Available, Maritime Reporter and Engineering News, p. 13 (Dec. 15, 1983).
Denny, M., Blip, Ping, and Buzz, JHU Press, 1st ed. (2007).
Flemming, B.W., M. Klein, P.M. Denbigh, Recent Developments in Side Scan Sonar Techniques, (1982).
Hansen, R.E., Introduction to Sonar, Course Material to INF-GEO4310, University of Oslo, (Oct. 7, 2009).
Kurie, F.N.D. Design and Construction of Crystal Transducers, Office of Scientific Research and Development Washington D C., (1946).
Loeser, Harrison T., Sonar Engineering Handbook, Peninsula Publishing (1992).
Medwin, H. et al., Fundamentals of Acoustical Oceanography, Academic Press (1998).
Miller, S.P., Selected Readings in Bathymetric Swath Mapping, Multibeam Sonar System Design, University of California Santa Barbara (Apr. 1993).
Sherman, C. & J. Butler, Transducers and Arrays for Underwater Sound, Springer Sci. & Bus. Media, 1st ed. (2007).
Stansfield, D., High Frequency Designs, Underwater Electroacoustic Transducers: A Handbook for Users and Designers, Bath University Press and Institute of Acoustics (1991).
Urick, R.J., Principles of Underwater Sound, 3rd Edition, McGraw-Hill Book Company, 1983.
Wilson, O.B., An Introduction to the Theory and Design of Solar Transducers, Navy Postgraduate School, Monterey, California (Jun. 1985).
Woollett, R.S., Sonar Transducer Fundamentals, Scientific and Engineering Studies, Naval Underwater Systems Center (1984).
Bass, G. New Tools for Undersea Archeology, National Geographic, vol. 134, pp. 403-422 (1968).
Chesterman, W.D., Clynick, P.R., and Stride, A.H., An Acoustic Aid to Sea Bed Survey, Acustica, pp. 285-290, Apr. 1958.
Cyr, Reginald, A Review of Obstacle Avoidance/Search Sonars Suitable for Submersible Applications, Marine Tech. Soc. Journal., vol. 20, No. 4, pp. 47-57(Dec. 1986).
Donovan, D.T., Stride, A.H., and Lloyd, A.J., An Acoustic Survey of the Sea Floor South of Dorsey and its Geological Interpretation, Philosophical Transactions of the Royal Society of London, Series B, Biological Sciences, pp. 299-330 (Nov. 1961).
Flemming, B.W., Side-Scan Sonar: A Practical Guide, International Hydrographic, pp. 65-92 (Jan. 1976).
Hershey, J. B, et al., Sonar Uses in Oceanography, Presented at Instrument Automation Conference and Exhibit, New York, NY, Sep. 1960.
Hydro Surverys: Side Scan Sonar Systems, Hydro International (2008).
Morang, Andrew, Kucharski, William M., Side-Scan Investigation of Breakwaters at Calumet and Burns Harbors in Southern Lake Michigan, Oceans 86 Conference Record, pp. 458-465, Sep. 1986.
Newman, P., Durrant-Whyte, H., Using Sonar in Terrain-Aided Underwater Navigation, IEEE Proceedings, (May 1998).
Noble, N., The Telltale Sound of Depth, Motor Boating and Sailing, pp. 23-24(Aug. 1976).
Pappalardo, M., Directivity Pattern of a Linear Array Transducer in High Frequency Range, Journal de Physique, pp. 32-34 (Nov. 1972).
Patterson, D.R., and J. Pope, Coastal Applications of Side Scan Sonar, Proceedings of Coastal Structures '83, Mar. 1983.
Onoe, M., and Tiersten, H.F., Resonant Frequencies of Finite Piezoelectric Ceramic VIbrators with High Electromechanical Coupling, IEEE Transactions of Ultrasonics Engineering, pp. 32-39 (Jul. 1963).
Rusby, Stuart, A Long Range Side-Scan Sonar for Use in the Deep Sea (GLORIA Project) Int. Hydrogr. Rev., pp. 25-39 (1970).
Rossing, Thomas D., Sonofusion??, ECHOES: The Newsletter of the Acoustical Society of America, vol. 12, No. 2 (Spring. 2002).
Somers, M.L., and Stubbs, A.R., Sidescan Sonar, IEE Proceedings, pp. 243-256, Jun. 1984.
Spiess, F.N., Acoustic Imaging, Society of Photo-optical Instrumentation. Engineers' Seminar-in-Depth on Underwater Photo-optical Instrumentation Applications, pp. 107-115 (Mar. 1971).
Stride, A.H., A Linear Pattern on the Sea Floor and its Interpretation, National Institute of Oceanography, Wormley, Surrey, pp. 313-318 (1959).
Tyce, R.C., Deep Seafloor Mapping Systems A Review, Marine Tech. Soc. Journal., vol. 20, No. 4, pp. 4-16 (Dec. 1986).
Wang, H.S.C., Amplitude Shading of Sonar Transducer Arrays, The Journal of the Acoustical Society of America, pp. 1076-1084, (May 1975).
Benthien, George W, and Hobbs, Stephen, Technical Report: Modeling of Sonar Transducers and Arrays, Sep. 2005.
Barnum, S.R. CDR, Descriptive Report to Accompany Hydrographic Survey Side, Scan Sonar / Multibeam Survey of Portsmouth Harbor, Survey No. H11014 (2001).
Clausner, J. Coastal Engineering Technical Note: Side Scan Sonar for Inspecting Coastal Structures, CETN-III-16, U.S. Army Engineer Waterways Experiment Station, (Nov. 1983).
Craig, J.D., Engineering and Design: Evaluation and Repair of Concrete Structures, Manual No. 1110-2-2002, US Army Corps of Engineers, Department of the Army (Jun. 1995).
McMillan, Ken, The Application of Sector Scanning Sonar Technology to the Mapping of Granular Resources on the Beaufort Shelf using the Sea-Ice as a Survey Platform, McQuest Marine Research and Development Company, Report Prepared Geological Survey of Canada Atlantic, (Mar. 1997).
Ronhovde, A., High Resolution Beamforming of Simrad EM3000 Bathymetric Multibeam Sonar Data, Cand Scient thesis, University of Oslo, Norway. (Oct. 1999).
Speiss, F.N., and Tyce, R.C., Marine Physical Laboratory Deep Tow Instrumentation System, Deep Submergence Systems Project and Office of Naval Research, Report No. MPL-U-69/72, (Mar. 1973).
Williams, S. Jeffress, Use of High Resolution Seismic Reflection and Side-Scan Sonar Equipment for Offshore Surveys, CETA 82-5, U.S. Army Corps of Engineers Coastal Engineering Research Center (Nov. 1982).
EdgeTech 2000-CSS Integrated Coastal System Subscan Brochure (date unknown).
HyPack Inc.: HyPack Software User Manual (date unknown).
L-3 Communications SeaBeam Instruments Technical Reference: Multibeam Sonar Theory of Operation, (2000).
QPS b.v.,: Qinsy User Manual (Apr. 27, 2004).
SIMRAD Kongsberg EM Series Multibeam Echo Sounder Operators Manual (2000).
Tritech Technical Data Sheet: ROV/AUV Side Scan—Sea King Side Scan Sonar (date unknown).
Tritech Manual: Starfish Hull Mount Sonar System User Guide (date unknown).
Triton Elics Intl.: ISIS Sonar® User's Manual, vols. 1 and 2 (Jun. 2004).
Vernitron Product Catalog: Modern Piezoelectric Ceramics, Custom Material Product Catalog (date unknown).

(56) References Cited

OTHER PUBLICATIONS

Oceanic Imaging Consultants (OIC) Inc.: GeoDAS SDV Geophysical Data Acquisition System Brochure.
SonarWeb Pro [retrieved Feb. 10, 2015]. Via the Internet Archive Wayback Machine at https://web.archive.org/web/20090622013837/http://chesapeaketech.com/prod-webpro.html (Jun. 22, 2009). 4 pages.
Feature Matrix—SonarTRX/-Si/-LSS Sidescan sonar processing software (Version 13.1—Feb. 20, 2013) [retrieved Feb. 10, 2015]. Retrieved from the Internet: http://www.sonartrx.com/Documents/SonarTRX-FeatureMatrix-1301.pdf (dated Feb. 10, 2015). 2 pages.
Hussong, D.M., et al., "High-Resolution Acoustic Seafloor Mapping," $20^{th}$ Annual OTC, Houston, TX, May 2-5, 1988.
Green, J. "Maritime Archaeology: A Technical Handbook". 2nd Edition. Academic Press; May 19, 2004, pp. 1-468.

\* cited by examiner

SONAR SYSTEM USING FREQUENCY BURSTS

This application claims the benefit of and priority to U.S. provisional patent application Ser. No. 61/668,971, filed Jul. 6, 2012 and titled MULTIPLE FREQUENCY TRANSMIT BURSTS, the entire disclosure of which is herein incorporated by reference.

BACKGROUND

The following descriptions and examples do not constitute an admission as prior art by virtue of their inclusion within this section.

Sonar has been used to detect waterborne or underwater objects. For example, sonar devices may be used to determine depth and bottom topography, detect fish or other waterborne contacts, or locate wreckage. Devices such as transducer elements, or transducers, have been developed to produce sound at a particular frequency. These transducer elements may transmit the sound into and through the water, and they may also detect echo returns from sound that return to the transducer elements after reflecting off of an object.

Transducer elements may convert an electrical signal into sound energy and, conversely, may convert sound energy, detected via pressure changes, into an electrical signal. In operation, a transducer element may produce a sound pressure signal which emanates in a beam pattern such that a pressure wave is generated, where the pressure wave expands as it moves away from the source. Reflected sound may then return to the transducer element in the form of a sonar return signal, where the sonar return signal may be interpreted as a surface of an object. Such transducer elements may be directed in various directions from surface or submersible vessels to locate other vessels, or the transducer elements may be directed towards the seabed for navigation and/or target location. Display technology may also be utilized in the interpretation of sonar data representing the sonar return signals, such as through liquid crystal displays (LCDs) or other digital displays. In one example, transducer elements may be constructed using piezoelectric material.

To identify objects within water, a sonar system may use one or more transducer elements, where a transmitting element may be used to transmit electrical signals to the transducer elements in order to produce sound energy into and through the water. In one scenario, the sonar system may use a plurality of transmitting elements in order to transmit electrical signals of varying frequencies to the transducer elements. Sonar systems utilizing a plurality of transmitting elements may necessitate increased cost and/or additional space requirements when compared to sonar systems that use one transmitting element.

SUMMARY

Described herein are implementations of various technologies for a sonar system using frequency bursts. In one implementation, a sonar system for use with a vessel may include a sonar module having a transmitting element configured to generate a transmit signal, where the transmit signal comprises one or more bursts, and where at least one burst comprises a first portion having a first frequency and a second portion having a second frequency different than the first frequency. The sonar system may also include a transducer array in communication with the sonar module, where the transducer array is configured to (i) receive the transmit signal from the transmitting element, (ii) produce one or more sonar beams based on the first frequency and the second frequency, and (iii) receive one or more sonar return signals from an underwater environment.

In another implementation, a sonar system for use with a vessel may include a sonar module having a transmitting element configured to generate a transmit signal, where the transmit signal comprises one or more bursts, and where at least one burst comprises a first portion having a first frequency and a second portion having a second frequency different than the first frequency. The sonar system may also include a transducer array in communication with the sonar module, where the transducer array includes a linear transducer element configured to (i) receive the transmit signal from the transmitting element, (ii) produce one or more first sonar beams based on the first frequency and the second frequency, and (iii) receive a first sonar return signal from an area of water proximate a first side of the vessel. The transducer array may also include a circular transducer element connected in parallel with the linear transducer element and configured to (i) receive the transmit signal from the transmitting element, (ii) produce one or more second sonar beams based on the first frequency and the second frequency, and (iii) receive a second sonar return signal from an area of water proximate a second side of the vessel.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
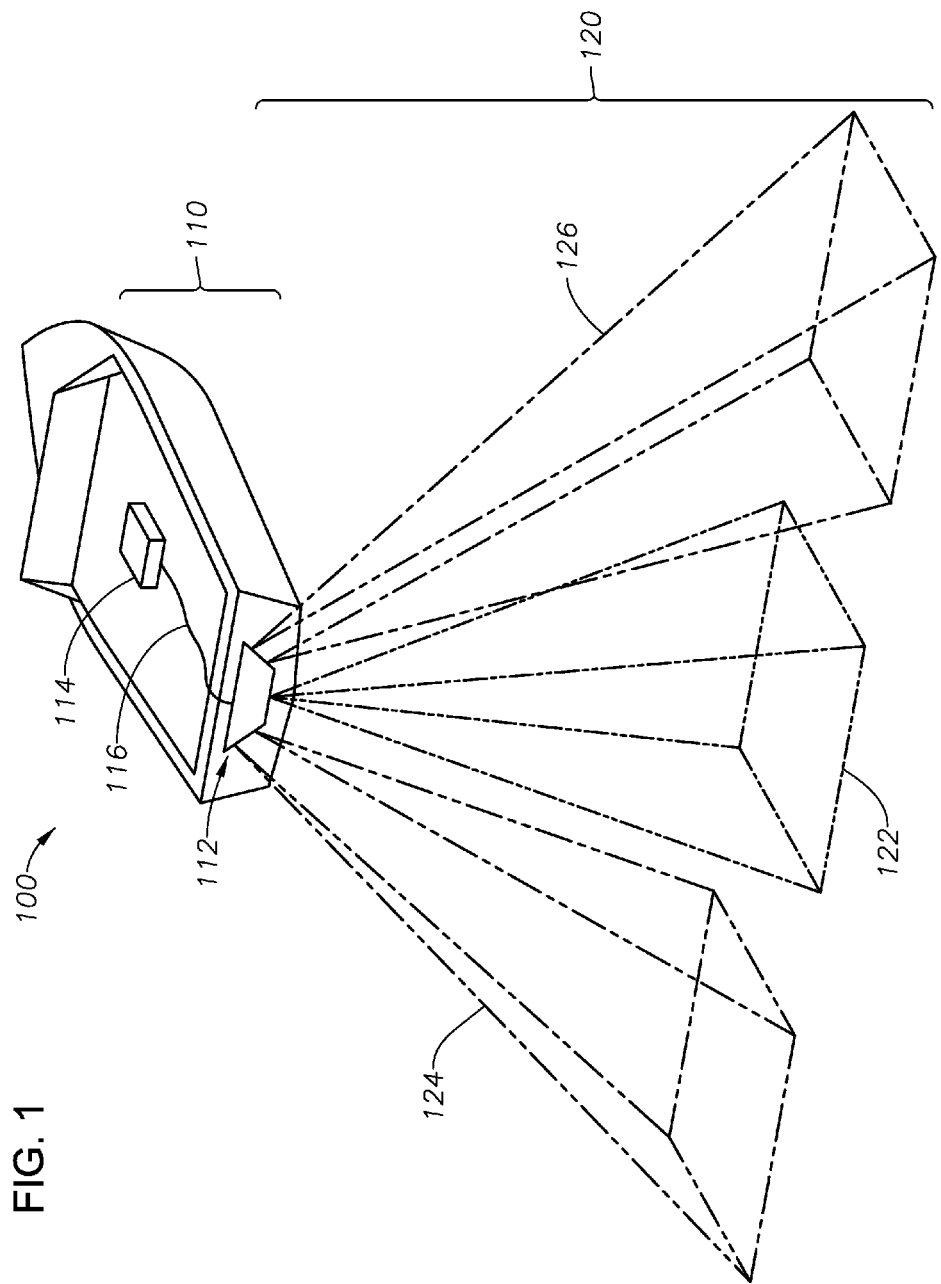
FIG. 1 illustrates a vessel having a first sonar system using frequency bursts in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "anH" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the terms "up" and "down"; "upper" and "lower"; "upwardly" and "downwardly"; "below" and "above"; and other similar terms indicating relative positions above or below a given point or element may be used in connection with some implementations of various technologies described herein. However, when applied to equipment and methods for use in wells that are deviated or horizontal, or when applied to equipment and methods that when arranged in a well are in a deviated or horizontal orientation, such terms may refer to a left to right, right to left, or other relationships as appropriate.

The following paragraphs provide a brief summary of various technologies and techniques directed at a sonar system using frequency bursts described herein.

A first sonar system may be coupled or mounted to a vessel and may be configured to identify objects in water to either side of and/or below the vessel. The first sonar system may include a transducer array coupled to a sonar module. The sonar module may be communicably coupled to the transducer array, where the sonar signal processor of the sonar module may be configured to process data received from the transducer array.

The sonar module may also include a left receiving element, a down receiving element, a transmitting element, a transmit/receive (T/R) switch, and a right receiving element. The transmitting element may be configured to send a transmit signal from the sonar signal processor to the transducer array. In addition, the left receiving element, the down receiving element, and the right receiving element may each be configured to receive respective sonar data from the transducer array. In one implementation, the left receiving element, the down receiving element, and the right receiving element may each be configured to filter its received sonar data based on a specified frequency.

The transducer array may include a plurality of transducer elements positioned within the one or more housings, including a left transducer element, a down transducer element, and a right transducer element. In one implementation, the down transducer element may receive the transmit signal from the transmitting element, and, in response, produce one or more sonar beams through areas of water proximate to the sides of and/or below the vessel. For example, a left, down, and right face of the down transducer element may produce a sonar beam directed to an area of water proximate to and/or below a left, down, and right side of the vessel. The left, down, and right transducer element may be positioned on a left, down, and right side of the housing to receive sonar return signals from the area of water proximate to and/or below the left, down, and right side of the vessel. The left transducer element, the down transducer element, and the right transducer element may each be configured to also send respective sonar data to the sonar module, where the respective sonar data may be representative of respective sonar return signals.

The transmit signal may be a frequency burst signal, where each burst of the transmit signal may include a first portion of signal pulses having a first frequency and a second portion of signal pulses having a second frequency. The first frequency and second frequency may be different frequencies. In one implementation, the first portion of signal pulses may be of a shorter duration in time than the second portion. The first portion may be used to filter the down sonar data and the second portion may be used to filter the right and left sonar data. For example, the down receiving element may filter its down sonar data based on the first frequency, while the left receiving element may filter its left sonar data based on the second frequency and the right receiving element may filter its right sonar data based on the second frequency.

Similar to the first sonar system, the second sonar system may be coupled or mounted to the vessel and may be configured to identify objects in water to either side of and/or below the vessel. The second sonar system may include a transducer array coupled to a sonar module. The sonar module may be communicably coupled to the transducer array, where the sonar signal processor may be configured to process data received from the transducer array.

The sonar module may also include a receiving element, a transmitting element, and a T/R switch. The receiving element may be configured to receive sonar data from the transducer array. The receiving element may include a first filter and a second filter. The first filter and the second filter may each be configured to filter the sonar data based on one or more frequencies, where the first filter and the second filter may use different frequencies. In addition, the sonar signal processor may receive filtered sonar data from each of the first filter and the second filter of the receiving element.

The transducer array may include a plurality of transducer elements positioned within the one or more housings, including a circular transducer element and a linear transducer element. The circular transducer element and the linear transducer element may also be connected in parallel within a housing of the transducer array. In particular, the circular transducer element and the linear transducer element may each be coupled to a positive transducer wire and a negative transducer wire within the housing.

Further, the circular transducer element and the linear transducer element may each receive the transmit signal from the transmitting element via the positive transducer wire and the negative transducer wire, and, in response, produce one or more sonar beams through areas of water proximate to the sides of and/or below the vessel. The circular transducer element and the linear transducer element may each be configured to receive respective sonar return signals from respective areas of water proximate to and/or below the vessel. The circular transducer element and the linear transducer element may each be configured to send respective sonar data to the sonar module, where the respective sonar data may be representative of the respective sonar return signals.

The transmit signal of the second sonar system may be a frequency burst signal, similar to the transmit signal discussed above. For example, each burst of the transmit signal may include a first portion of signal pulses having a first frequency and a second portion of signal pulses having a second frequency, where the first frequency and second frequency are different. In one implementation, the first filter may filter its received sonar data based on the first frequency, such that the first filter produces filtered sonar data which relate to first sonar data received from the linear transducer element. Further, the second filter may filter its received sonar data based on the second frequency, such that the second filter produces filtered sonar data which relate to the second sonar data received from the circular transducer element. In the first sonar system and the second sonar system, only one transmitting element may be needed to send signals having more than one frequency to a transducer array, thereby minimizing cost and/or space requirements when compared to using more than one transmitting element.

Various implementations of a sonar system using frequency bursts described above will now be described in more detail with reference to FIGS. 1-7.

First Sonar System Configuration

FIG. 1 illustrates a vessel 100 having a first sonar system 110 using frequency bursts in accordance with implementations of various techniques described herein. The first sonar system 110 may be coupled or mounted to the vessel 100 and may be configured to identify objects in water to either side of and/or below the vessel 100. The vessel 100 may be a surface water vehicle, a submersible water vehicle, or any other implementation known to those skilled in the art.

The first sonar system 110 may include a transducer array 112 coupled to a sonar module 114. In one implementation, the transducer array 112 may be coupled to the sonar module 114 via a communication cable 116. The sonar module 114 may be configured to process data received from the transducer array 112 through the communication cable 116. The transducer array 112 may include a plurality of transducer elements configured to produce one or more sonar beams 120 which provide substantially continuous sonar coverage from one side of the vessel 100 to an opposite side of the vessel 100. As illustrated in FIG. 1, sonar beams 120 may include sonar beam 122, sonar beam 124, and sonar beam 126.

The transducer array 112 may receive one or more transmit signals from the sonar module 114, and, in response, produce one or more sound pressure signals which emanate as one or more sonar beams 120. In one implementation, the transmit signal may be an electrical signal used by the transducer array 112 to produce the sonar beams 120. Reflected sound may then return to the transducer array 112 in the form of one or more sonar return signals, where the sonar return signals may include details about an area of water proximate to the sides and/or the bottom of the vessel 100. In turn, the transducer array 112 may convert the sonar return signals into sonar data to be sent to the sonar module 114, where the sonar data may be one or more electrical signals which may be representative of the sonar return signals.

The transducer array 112 may include one or more linear transducer elements which produce one or more planar fan-shaped sonar beams, such as sonar beam 122, sonar beam 124, and sonar beam 126. The planar fan-shaped sonar beams may be relatively narrow in beamwidth in a direction parallel to a keel of the vessel 100 and relatively wide in beamwidth in a direction perpendicular to the keel of the vessel 100. In other implementations, the transducer array 112 may include one or more circular transducer elements which produce one or more conical sonar beams, with the conical sonar beams having an apex located at the one or more circular transducer elements.

Figure 2:
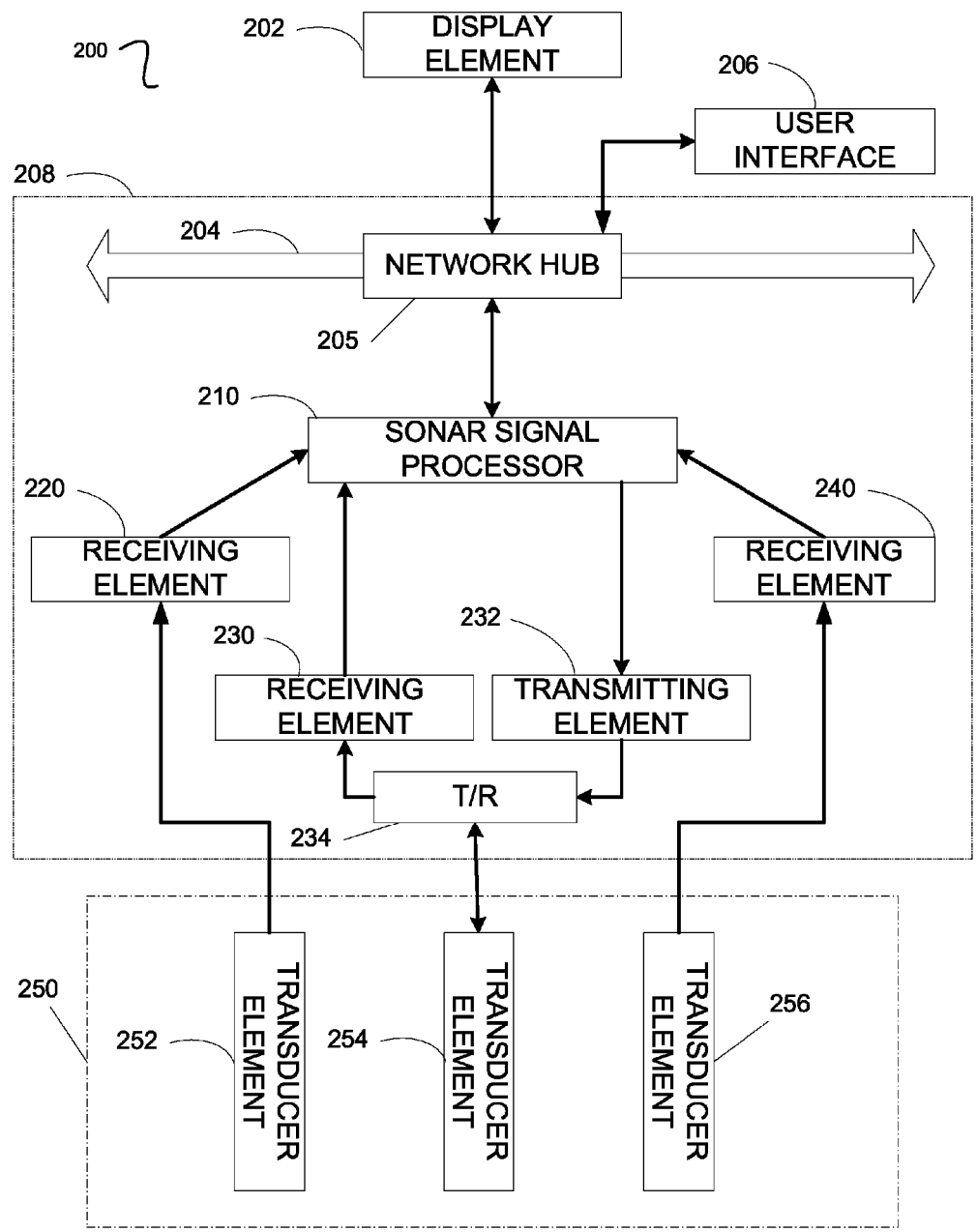
FIG. 2 illustrates a block diagram of a first sonar system using frequency bursts in accordance with implementations of various techniques described herein.

FIG. 2 illustrates a block diagram of a first sonar system 200 using frequency bursts in accordance with implementations of various techniques described herein. The first sonar system 200 may include various components, which may include means embodied in hardware and/or software configured to perform one or more corresponding functions. For example, in one implementation, components of the first sonar system 200 may include a display element 202, a user interface 206, a sonar module 208, and a transducer array 250. The first sonar system 200 may be similar to the first sonar system 110, the sonar module 208 may be similar to the sonar module 114, and the transducer array 250 may be similar to the transducer array 112. Further, the sonar module 208 may include a network hub 205 and a sonar signal processor 210.

The display element 202, the user interface 206, and/or the sonar module 208 may be configured to communicate with one another via a network 204 and/or the network hub 205. The network 204 may include Ethernet or any other network implementation known to those skilled in the art. In one implementation, the display element 202, the user interface 206, and/or the sonar module 208 may be configured to communicate with one another directly without the use of the network 204. The display element 202, the sonar module 208, and/or the user interface 206 may be located in one or more housings. The network hub 205 may include one or more interface ports to allow components, such as the display element 202 or the user interface 206, to communicate with the network 204. In one implementation, the network hub 205 may be configured to allow for plug-and-play communication with the display element 202 and/or the user interface 206.

The display element 202 may be configured to display images, where it may receive data from the sonar signal processor 210 and render the data into one or more windows on the display element 202. For example, the display element 202 may include a liquid crystal display (LCD) screen, a touch screen display, or any other implementation known to those skilled in the art. In one implementation, the display element 202 may include two or more displays.

A user may interact with the first sonar system 200 through the user interface 206. The user interface 206 may include, for example, a keyboard, keypad, function keys, mouse, scrolling device, input/output ports, touch screen, or any other user interface known to those skilled in the art. In one implementation, the user interface 206 may be integrated into the display element 202.

The sonar module 208, the display element 202, and/or the user interface 206 may be placed or mounted in the vessel. In one implementation, the sonar module 208 may be a mobile device configured to be placed throughout the vessel. The sonar module 208 may be communicably coupled to the transducer array 250, where the sonar signal processor 210 may be configured to process data received from the transducer array 250. In one implementation, the transducer array 250 may be coupled to the sonar module 208 via a communication cable (not pictured).

The sonar signal processor 210 may be any device or circuitry operating in accordance with hardware and/or software which configures the device or circuitry to perform the corresponding functions of the sonar signal processor 210 as described herein. In some implementations, the sonar signal processor 210 may include a processor, a processing element, a coprocessor, a controller, an application specific integrated circuit (ASIC), a field programmable gate array (FPGA), a hardware accelerator, or any other implementation known to those skilled in the art, where the sonar signal processor 210 is configured to execute various programmed operations or instructions stored in a memory device. The sonar signal processor 210 may further include multiple compatible additional hardware and/or software items configured to: (i) implement signal processing or enhancement features to improve display characteristics, data, and/or images, (ii) collect or process additional data, such as time, temperature, global positioning system (GPS) information, and/or waypoint designations, or (iii) filter extraneous data to better analyze the collected data. The sonar signal processor 210 may further implement notices and alarms, such as those determined or adjusted by a user, to reflect depth, presence of fish, and/or proximity of other watercraft. Still further, the sonar signal processor 210, in combination with suitable memory, may store incoming data from the transducer array 250, screen images for future playback, transfer and/or alter images with additional processing to implement zoom or lateral movement, or correlate data such as fish or bottom features to a GPS position or temperature.

The sonar module 208 may also include a left receiving element 220, a down receiving element 230, a transmitting element 232, a transmit/receive (T/R) switch 234, and a right receiving element 240. The left receiving element 220, the down receiving element 230, the transmitting element 232, the T/R switch 234, and the right receiving element 240 may each be any device or circuitry operating in accordance with hardware and/or software which configures the device or circuitry to perform their respective functions as described herein.

The transmitting element 232 may be configured to send a transmit signal from the sonar signal processor 232 to the transducer array 250. The transmitting element 232 may be a transmitter, a transceiver, or any other implementation known to those skilled in the art. In addition, the left receiving element 220, the down receiving element 230, and the right receiving element 240 may each be configured to receive respective sonar data from the transducer array 250. The left receiving element 220, the down receiving element 230, and the right receiving element 240 may each be a receiver, a transceiver, or any other implementation known to those skilled in the art. In one implementation, the left receiving element 220, the down receiving element 230, and the right receiving element 240 may each be configured to filter its received sonar data based on a specified frequency.

In addition, the left receiving element 220, the down receiving element 230, and the right receiving element 240 may each be configured to send their respective filtered sonar data to the sonar signal processor 210. In one implementation, the filtered sonar data may be displayed using the display element 202 after being received from the sonar signal processor 210. In another implementation, the T/R switch 234 may be used to alternate between sending the transmit signal to the transducer array 250 or sending respective sonar data to the down receiving element 230.

The transducer array 250 may be disposed in one or more housings that are positioned on, or placed proximate to, the vessel employing the sonar system 200. In one implementation, the transducer array 250 may be disposed in one or more housings that are flexibly mounted to a hull of the vessel. In another implementation, the transducer array 250 may be mounted onto another device or component attached to the hull, such as a trolling motor or other steerable device. In yet another implementation, the transducer array 250 and the sonar module 208 may be placed in the same housing.

The transducer array 250 may include a plurality of transducer elements, including a left transducer element 252, a down transducer element 254, and a right transducer element 256, some of which may be disposed within the one or more housings. The transducer elements may be substantially identical in terms of construction and/or geometrical dimensions, while also differing in terms of orientation and/or usage. For example, the left transducer element 252, the down transducer element 254, and the right transducer element 256 may each be a linear transducer element, such that each may be substantially rectangular in shape. In addition, the transducer elements may each be constructed using piezoelectric material. In one implementation, the transducer elements may be employed in a sidescan sonar configuration to identify objects in water below and to either side of the vessel. In other implementations, the transducer elements may include any combination of one or more circular transducer elements, one or more linear transducer elements, or any other transducer element known to those skilled in the art.

Figure 3:
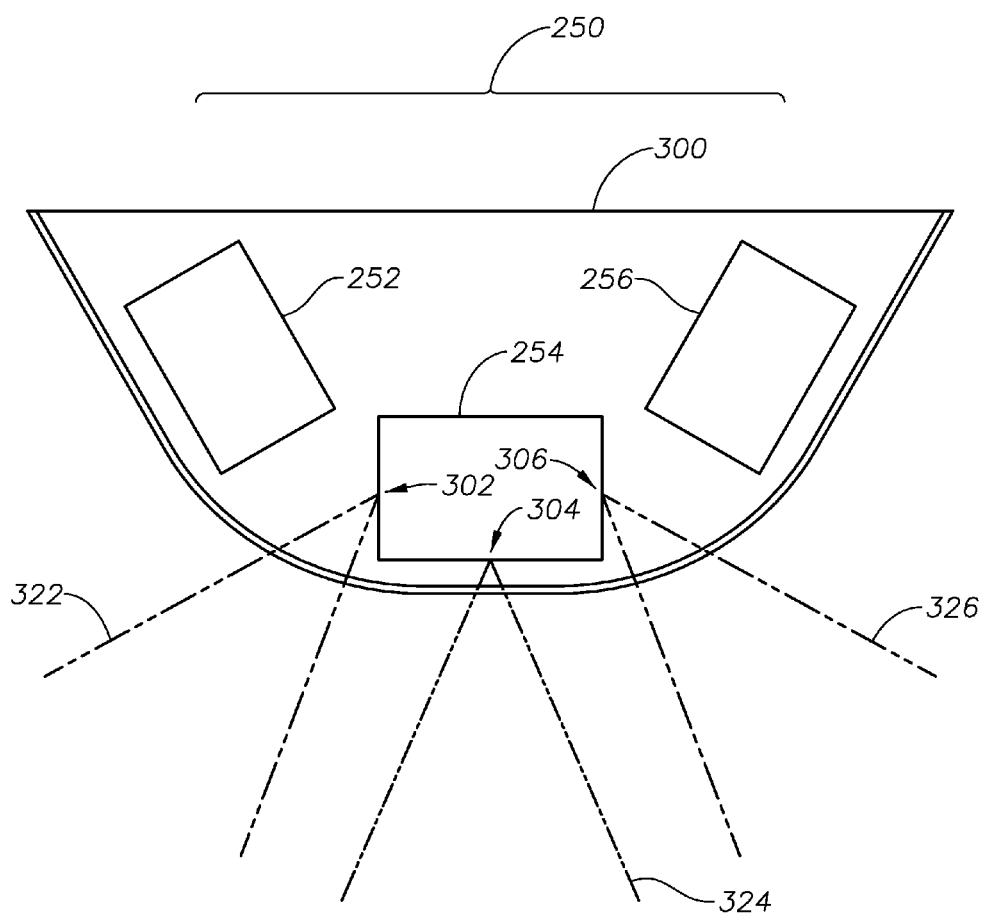
FIG. 3 illustrates a cross-sectional view of a transducer array disposed in a housing mounted to a vessel in accordance with implementations of various techniques described herein.

One implementation of the transducer array 250 including the left transducer element 252, the down transducer element 254, and the right transducer element 256 is described in more detail with respect to FIG. 3. FIG. 3 illustrates a cross-sectional view of the transducer array 250 disposed in a housing 300 mounted to the vessel in accordance with implementations of various techniques described herein.

In one implementation, the down transducer element 254 may receive the transmit signal from the transmitting element 232, and, in response, produce one or more sonar beams through areas of water proximate to the sides of and/or below the vessel. For example, a left face 302 of the down transducer element 254 may produce a sonar beam 322 directed to an area of water proximate to and/or below a left side of the vessel. A down face 304 of the down transducer element 254 may also produce a sonar beam 324 directed to a water column substantially below the vessel. Further, a right face 306 of the down transducer element 254 may produce a sonar beam 326 directed to an area of water proximate to and/or below a right side of the vessel. In addition, the left transducer element 252 and the right transducer element 256 may not produce sonar beams.

The down transducer element 254 may insonify areas of water proximate to the sides of and/or below the vessel, whereby the sonar beams 322, 324, and 326 provide substantially continuous sonar coverage from one side of the vessel to an opposite side of the vessel. In one implementation, an acoustic shield may be applied to the down transducer element 254 such that the down transducer element 254 may produce the sonar beams 322, 324, and 326 in desired directions in the areas of water proximate to the sides of and/or below the vessel.

The left transducer element 252, the down transducer element 254, and the right transducer element 256 may each be configured to receive respective sonar return signals from respective areas of water proximate to and/or below the vessel. For example, the left transducer element 252 may be positioned on a left side of the housing 300 to receive sonar return signals from the area of water proximate to and/or below the left side of the vessel. The right transducer element 256 may be positioned on a right side of the housing 300 to receive sonar return signals from the area of water proximate to and/or below the right side of the vessel. The down transducer element 254 may be positioned substantially between the left transducer element 252 and the right transducer element 256 in the housing 300 to receive sonar return signals from the water column substantially below the vessel. In one implementation, an acoustic shield may be applied to the transducer elements such that the transducer elements receive respective sonar return signals from respective desired areas of water.

The left transducer element 252, the down transducer element 254, and the right transducer element 256 may each be configured to also send respective sonar data to the sonar module 208, where the respective sonar data may be representative of respective sonar return signals. For example, the left transducer element 252 may convert its sonar return signals into left sonar data to be sent to the left receiving element 220. The down transducer element 254 may convert its sonar return signals into down sonar data to be sent to the down receiving element 230. The right transducer element 256 may convert its sonar return signals into right sonar data to be sent to the right receiving element 240. As mentioned previously, the left receiving element 220, the down receiving element 230, and the right receiving element 240 may each filter its received sonar data based on a respective specified frequency and send its filtered sonar data to the sonar signal processor 210. The filtered sonar data may then be displayed using the display element 202.

In Operation Using Frequency Bursts

In operation, the transmit signal of the first sonar system 200 may be a frequency burst signal that may be composed of a sequence of bursts. Each burst may be composed of signal pulses of two or more frequencies. For example, each burst may include a first portion having a first frequency and a second portion having a second frequency, where the first frequency and second frequency are different. In one implementation, the first portion may be of a different duration of time (e.g., shorter) than the second portion. The bursts may be implemented using any waveform known to those skilled in the art.

Referring back to FIG. 2, in one implementation, the transmitting element 232 may be configured to send a transmit signal from the sonar signal processor 210 to the transducer array 250, where each burst of the transmit signal may include a first portion of signal pulses having a first frequency and a second portion of signal pulses having a second frequency. The down transducer element 254 may receive the transmit signal from the transmitting element 232, and, in response, produce one or more sonar beams via the left face 302, the down face 304, and the right face 306. The sonar beams may move through areas of water proximate to the sides of and/or below the vessel. The sonar beams may be produced based on the first frequency and the second frequency. For example, the sonar beams may propagate at both the first frequency and the second frequency.

Further, the respective sonar return signals received by the left transducer element 252, the down transducer element 254, and the right transducer element 256 may include details about areas of water proximate to and/or below the vessel, where the details may be derived using the sonar beams that were produced based on the first frequency and the second frequency. The left receiving element 220, the down receiving element 230, and the right receiving element 240 may then receive respective sonar data representative of the respective sonar return signals, where each receiving element may filter its respective sonar data based on either the first frequency and/or the second frequency.

In the implementation where the first portion of each burst of the transmit signal may be of a shorter duration of time than the second portion, the first portion may be used to filter the down sonar data and the second portion may be used to filter the right and left sonar data. For example, the down receiving element 230 may filter its down sonar data based on the first frequency. The left receiving element 220 may filter its left sonar data based on the second frequency. The right receiving element 240 may filter its right sonar data based on the second frequency. In one implementation, the first frequency may be about 790 kilohertz (kHz) and the second frequency may be about 820 kHz. In another implementation, the first frequency may be about 430 kHz and the second frequency may be about 480 kHz.

Filtering the left sonar data and the right sonar data for the longer second frequency may allow for an improved clarity in images of the areas of water proximate to and/or below the left and right sides of the vessel in the display element 202. In particular, the areas of water proximate to and/or below the left and right sides of the vessel may be at a significant distance from the vessel, and filtering the left sonar data and the right sonar data for the longer second frequency may allow for an improved signal-to-noise ratio. Filtering the down sonar data for the shorter first frequency may also allow for sufficient resolution in images of the water column substantially below the vessel in the display element 202.

The duration of time of the first portion and the duration of time of the second portion may be selected by those skilled in the art to maximize resolution of images and/or signal-to-noise ratio of sonar data. Furthermore, the use of the first frequency and the second frequency may allow the receiving elements to filter for an appropriate portion of transmit signal, thus reducing smearing and/or interference of the sonar data. In sum, using the transmit signal where each burst may include the first frequency and the second frequency may lead to improved image resolution and/or data interpretation of the first sonar system. In such a scenario, only one transmitting element may be required, thereby minimizing cost and/or space requirements when compared to using more than one transmitting element.

Second Sonar System Configuration

Figure 4:
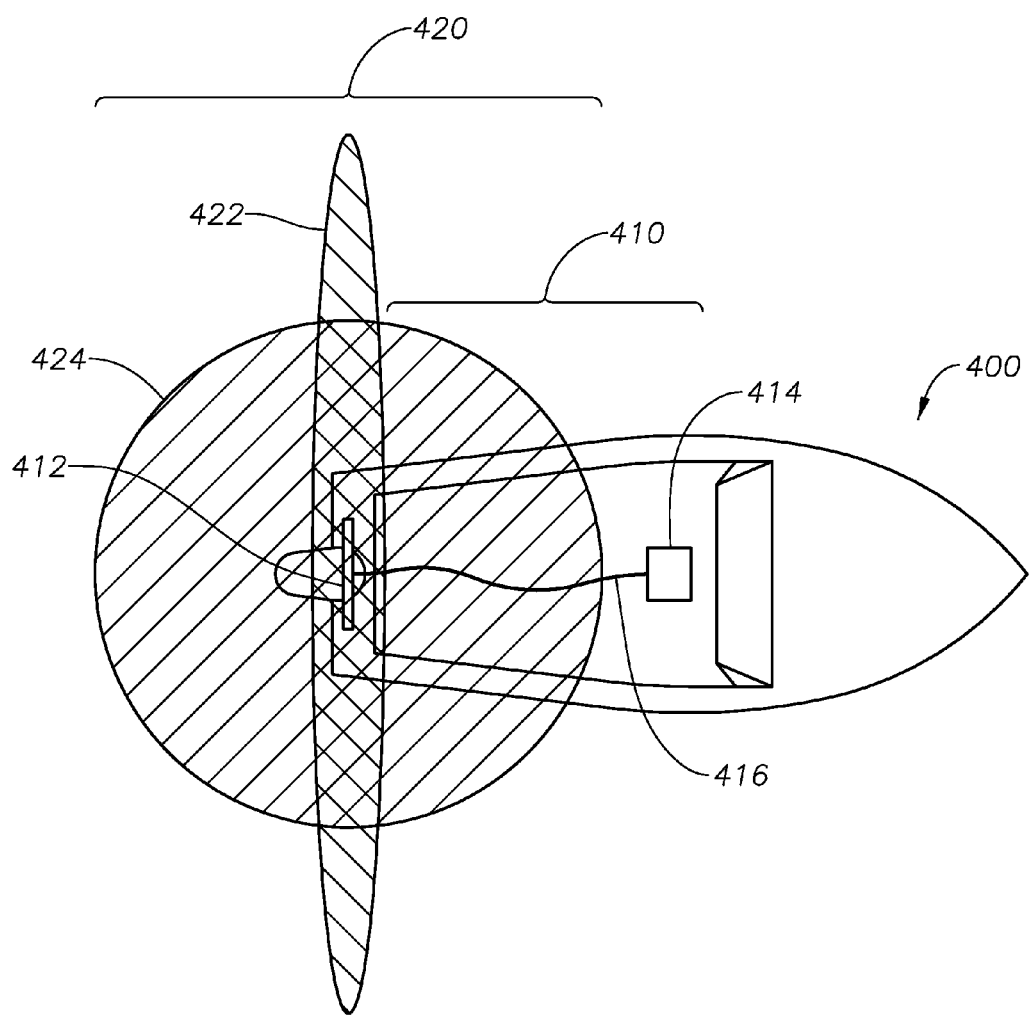
FIG. 4 illustrates a top view of a vessel having a second sonar system using frequency bursts in accordance with implementations of various techniques described herein.
Figure 5:
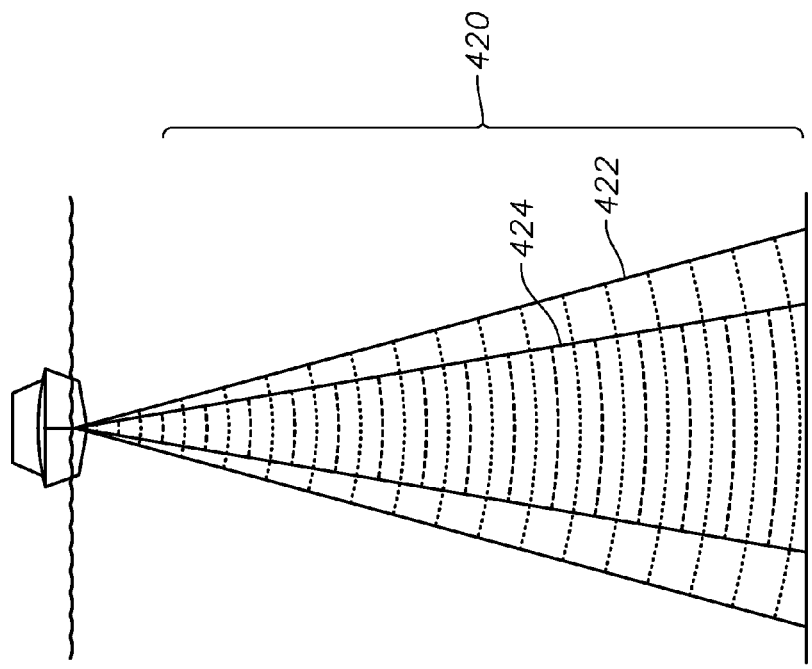
FIG. 5 illustrates a right view of a vessel having a second sonar system using frequency bursts in accordance with implementations of various techniques described herein.
Figure 6:
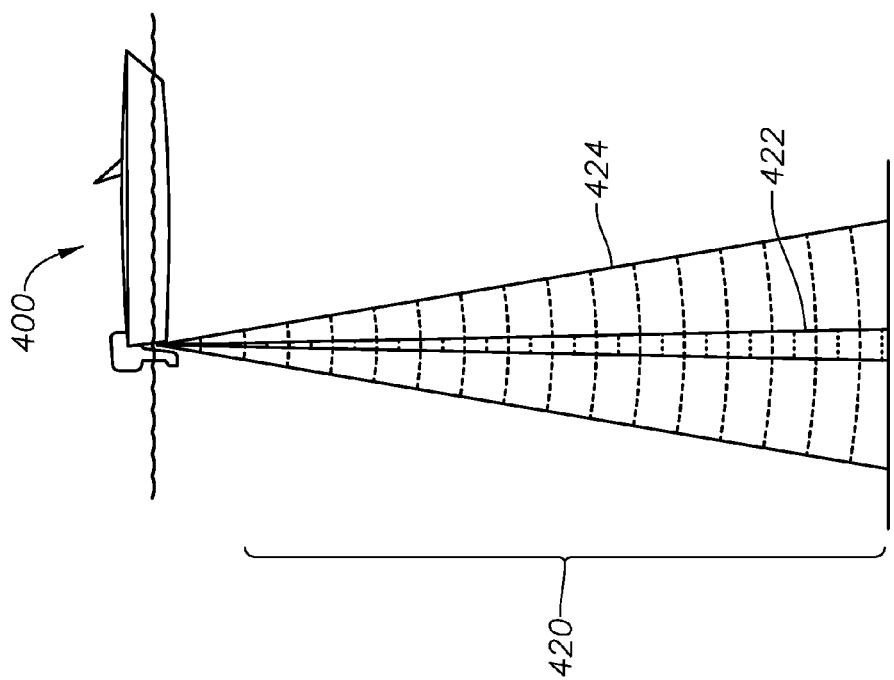
FIG. 6 illustrates a front view of a vessel having a second sonar system using frequency bursts in accordance with implementations of various techniques described herein.

FIG. 4 illustrates a top view of a vessel 400 having a second sonar system 410 using frequency bursts in accordance with implementations of various techniques described herein. The vessel 400 may be similar to the vessel 100. In addition, FIG. 5 illustrates a right view of the vessel 400 having the second sonar system 410 and FIG. 6 illustrates a front view of the vessel 400 having the second sonar system 410 in accordance with implementations of various techniques described herein. Similar to the first sonar system 110, the second sonar system 410 may be coupled or mounted to the vessel 400 and may be configured to identify objects in water to either side of and/or below the vessel 400.

The second sonar system 410 may include a transducer array 412 coupled to a sonar module 414. In one implementation, the transducer array 412 may be coupled to the sonar module 414 via a communication cable, such as a transducer cable 416. The sonar module 414 may be configured to process data received from the transducer array 412 via the transducer cable 416, where the transducer cable 416 is attached to a housing containing the transducer array 412. The transducer array 412 may include a plurality of transducer elements configured to produce one or more sonar beams 420 which provide substantially continuous sonar coverage from one side of the vessel 400 to an opposite side of the vessel 400. As illustrated in FIG. 4, the sonar beams 420 may include a sonar beam 422 overlapping with a sonar beam 424.

Similar to the transducer array 112, the transducer array 412 may receive one or more transmit signals from the sonar module 414, produce the one or more sonar beams 420 in response, receive sonar return signals which include details about an area of water proximate to the sides and/or the bottom of the vessel 400, and convert the sonar return signals into sonar data to be sent to the sonar module 414. In one implementation, the transducer array 412 may include a linear transducer element which produces a planar fan-shaped sonar beam, such as the sonar beam 422. Further, the transducer array 412 may also include a circular transducer element which produces a conical sonar beam, such as the sonar beam 422.

Figure 7:
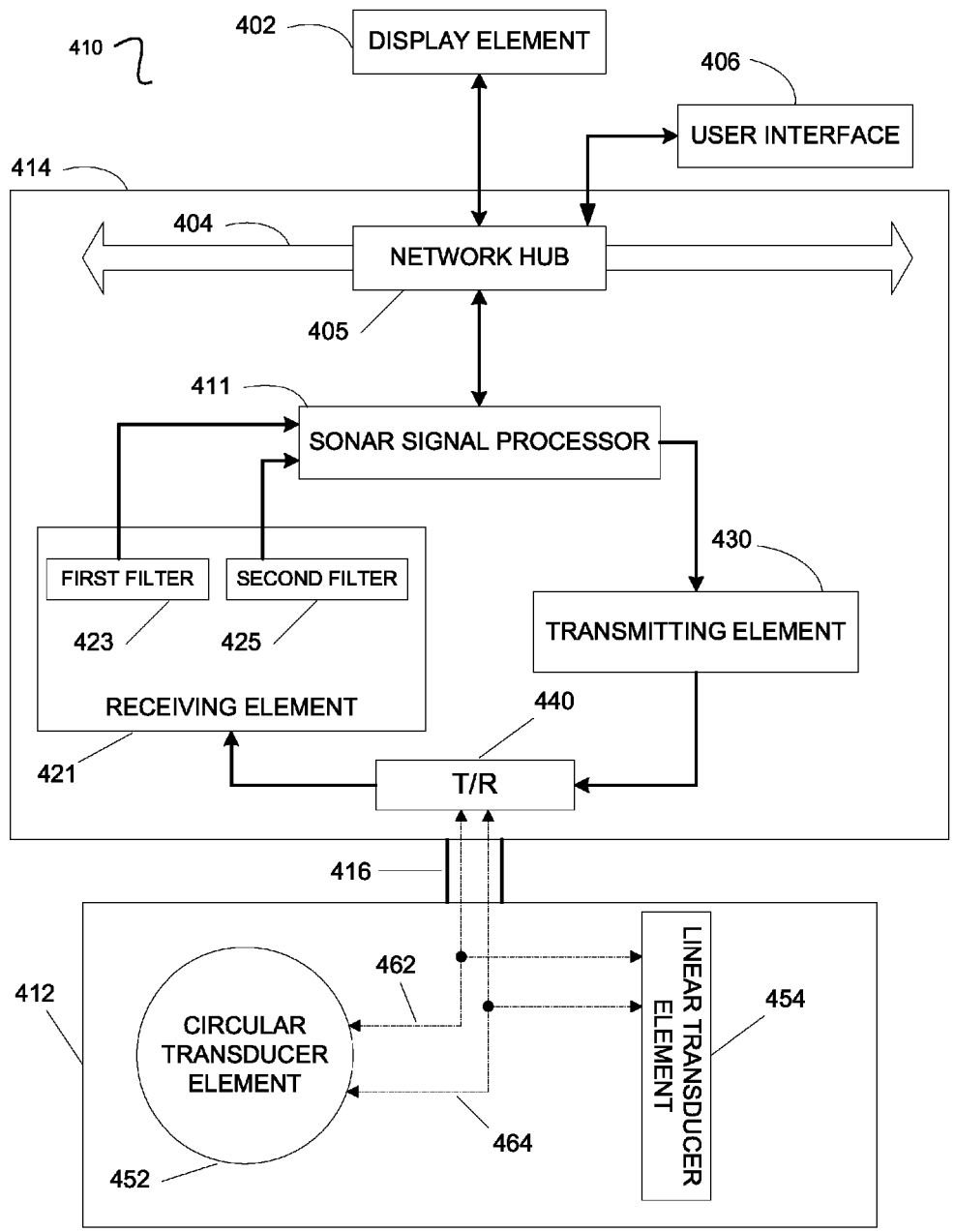
FIG. 7 illustrates a block diagram of a second sonar system using frequency bursts in accordance with implementations of various techniques described herein.

FIG. 7 illustrates a block diagram of the second sonar system 410 using frequency bursts in accordance with implementations of various techniques described herein. The second sonar system 410 may include various components, which may include means embodied in hardware and/or software configured to perform one or more corresponding functions. For example, in one implementation, components of the second sonar system 410 may include a display element 402, a user interface 406, the sonar module 414, and the transducer array 412.

The sonar module 414 may include a network hub 405 and a sonar signal processor 411. The display element 402, the user interface 406, the network hub 405, and the sonar signal processor 411 may be similar to corresponding components discussed with respect to FIG. 2.

The sonar module 414, the display element 402, and/or the user interface 406 may be placed or mounted in the vessel. In one implementation, the sonar module 414 may be a mobile device configured to be placed throughout the vessel. The sonar module 414 may be communicably coupled to the transducer array 412, where the sonar signal processor 411 may be configured to process data received from the transducer array 412. As illustrated, the transducer array 412 may be coupled to the sonar module 414 via the transducer cable 416.

The sonar module 414 may also include a receiving element 421, a transmitting element 430, and a T/R switch 440. The transmitting element 430 and the T/R switch 440 may be similar to the transmitting element 232 and the T/R switch 234, respectively. The receiving element 421 may be configured to receive sonar data from the transducer array 412. The receiving element 421 may be a receiver, a transceiver, or any other implementation known to those skilled in the art. In addition, the receiving element 421 may be any device or circuitry operating in accordance with hardware and/or software which configures the device or circuitry to perform its respective functions as described herein.

In one implementation, the receiving element 421 may include a first filter 423 and a second filter 425. The first filter 423 and the second filter 425 may each be configured to filter the sonar data based on one or more frequencies, where the first filter 423 and the second filter 425 may use different frequencies. In one implementation, the receiving element 421 may demultiplex the sonar data into the first filter 423 and the second filter 425, such as through frequency-division demultiplexing.

In addition, the sonar signal processor 411 may receive filtered sonar data from each of the first filter 423 and the second filter 425 of the receiving element 421. In one implementation, the filtered sonar data may be displayed using the display element 402 after being received from the sonar signal processor 411. In another implementation, the T/R switch 440 may be used to alternate between sending a transmit signal to the transducer array 412 or sending sonar data to the receiving element 421 from the transducer array 412. In yet another implementation, the first filter 423 and the second filter 425 may be implemented using separate receiving elements. The first filter 423 and/or the second filter 425 may also be implemented digitally.

Similar to the transducer array 250, the transducer array 412 may be disposed in one or more housings that are positioned on, or placed proximate to, the vessel employing the sonar system 410. In one implementation, the transducer array 412 and the sonar module 414 may be placed in the same housing.

The transducer array 412 may include a plurality of transducer elements positioned within the one or more housings, including a circular transducer element 452 and a linear transducer element 454. The circular transducer element 452 may be substantially cylindrical in shape. In addition, the linear transducer element 454 may be substantially rectangular in shape. In other implementations, the transducer array 412 may include any combination of transducer elements known to those skilled in the art.

The circular transducer element 452 and the linear transducer element 454 may also be connected in parallel within a housing of the transducer array 412. In particular, the circular transducer element 452 and the linear transducer element 454 may each be coupled to a positive transducer wire 462 and a negative transducer wire 464 within the housing. The positive transducer wire 462 and the negative transducer wire 464 may pass through the transducer cable 416 to the sonar module 414. In one implementation, the positive transducer wire 462 and the negative transducer wire 464 may be used to send the transmit signal and sonar data between the sonar module 414 and the transducer array 412. In particular, the positive transducer wire 462 and the negative transducer wire 464 may be used to communicate between the T/R switch 440 and the circular transducer element 452 and/or the linear transducer element 454.

Further, the circular transducer element 452 and the linear transducer element 454 may each receive the transmit signal from the transmitting element 430 via the positive transducer wire 462 and the negative transducer wire 464, and, in response, produce one or more sonar beams through areas of water proximate to the sides of and/or below the vessel. For example, the circular transducer element 452 may produce a conical sonar beam, with the conical sonar beam having an apex located at the circular transducer element 452. A beamwidth of the conical sonar beam may be substantially the same regardless of the side from which it is viewed.

In addition, the linear transducer element 454 may produce a planar fan-shaped sonar beam similar, where the planar fan-shaped sonar beam may be relatively narrow in beamwidth in a direction parallel to a keel of the vessel and relatively wide in beamwidth in a direction perpendicular to the keel of the vessel. In one implementation, the beamwidth of the planar fan-shaped sonar beam may be narrower than the conical sonar beam when viewed from a side of the vessel, but the beamwidth of the planar fan-shaped sonar beam may be wider when viewed from a front and/or back of the vessel.

In one implementation, the sonar beams produced by the transducer array 412 may provide substantially continuous sonar coverage from one side of the vessel to an opposite side of the vessel. The sonar beams produced by the transducer array 412 may also at least partially overlap in coverage. In one implementation, an acoustic shield may be applied to the circular transducer element 452 and/or the linear transducer element 454 to produce the sonar beams in desired directions in the areas of water proximate to the sides of and/or below the vessel. For example, sonar beams produced by the circular transducer element 452 and/or the linear transducer element 454 may be directed in a substantially downward direction from the vessel.

The circular transducer element 452 and the linear transducer element 454 may each be configured to receive respective sonar return signals from respective areas of water proximate to and/or below the vessel. For example, the circular transducer element 452 may receive sonar return signals from an area of water below a down side of the vessel in response to its conical sonar beam. In addition, the linear transducer element 454 may receive sonar return signals from an area of water below a down side of the vessel in response to its planar fan-shaped sonar beam. In one implementation, an acoustic shield may be applied to the transducer elements such that the transducer elements receive respective sonar return signals from desired areas of water.

The circular transducer element 452 and the linear transducer element 454 may each be configured to send respective sonar data to the sonar module 414, where the respective sonar data may be representative of the respective sonar return signals. For example, the linear transducer element 454 may convert its sonar return signals into first sonar data to be sent to the receiving element 421 via the positive transducer wire 462 and the negative transducer wire 464. In addition, the circular transducer element 452 may convert its sonar return signals into second sonar data to be sent to the receiving element 421 via the positive transducer wire 462 and the negative transducer wire 464. As mentioned previously, the receiving element 421 may filter the first sonar data and the second sonar data using the first filter 423 and the second filter 425. The filtered first sonar data and the filtered second sonar data may then be sent to the sonar signal processor 411. The filtered first sonar data and the filtered second sonar data may also be displayed using the display element 402.

In Operation Using Frequency Bursts

In operation, the transmit signal of the second sonar system 410 may be a frequency burst signal, similar to the transmit signal discussed with respect to FIGS. 1-3. For example, each burst of the transmit signal may include a first portion of signal pulses having a first frequency and a second portion of signal pulses having a second frequency, where the first frequency and second frequency are different. In one implementation, the first portion of signal pulses may be of a different duration of time (e.g., shorter) than the second portion.

Referring back to FIG. 7, in one implementation, the transmitting element 430 may be configured to send the transmit signal from the sonar signal processor 411 to the transducer array 412. The circular transducer element 452 and the linear transducer element 454 may each receive the transmit signal from the transmitting element 430 in parallel via the positive transducer wire 462 and the negative transducer wire 464, and, in response, produce one or more sonar beams through areas of water proximate to the sides of and/or below the vessel. In such an implementation, the sonar beams may be produced based on the first frequency and the second frequency. For example, the sonar beams may propagate at both the first frequency and the second frequency.

Further, the respective sonar return signals received by the circular transducer element 452 and the linear transducer element 454 may include details about areas of water proximate to and/or below the vessel, where the details may be derived using the sonar beams that were produced based on the first frequency and the second frequency. The circular transducer element 452 and the linear transducer element 454 may then each send respective sonar data to the receiving element 421 in parallel via the positive transducer wire 462 and the negative transducer wire 464, such that the first filter 423 and the second filter 425 may filter the respective sonar data based on either the first frequency and/or the second frequency.

In one implementation, the first frequency of each burst may be set to a desired resonant frequency for the linear transducer element 454. For example, the first frequency may be set to about 790 kHz or about 430 kHz. In addition, the second frequency of each burst may be set to a desired resonant frequency for the circular transducer element 452. For example, the second frequency may be set to about 50 kHz, about 83 kHz, or about 200 kHz.

In one implementation, the first filter 423 may filter its received sonar data based on the first frequency, such that the first filter 423 produces filtered sonar data which relate to the first sonar data received from the linear transducer element 454. Further, the second filter 425 may filter its received sonar data based on the second frequency, such that the second filter 425 produces filtered sonar data which relate to the second sonar data received from the circular transducer element 452.

In sum, using a transmit signal where each burst may include a first portion having a first frequency and a second portion having a second frequency may allow a sonar system to operate using multiple resonant frequencies for its transducer elements. In such a scenario, only one transmitting element may be required, thereby minimizing cost and/or space requirements when compared to using more than one transmitting element.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A sonar system for imaging an underwater environment underneath a vessel configured to travel along a surface of a body of water, wherein the vessel defines a port side and a starboard side, the sonar system comprising:
   a housing mountable to the vessel;
   a linear downscan transducer element having a substantially rectangular shape, positioned within the housing, and configured to produce a fan-shaped sonar beam directly beneath the vessel, wherein the fan-shaped sonar beam has a narrow beamwidth in a direction parallel to a fore-to-aft direction of the vessel and a wide beamwidth in a direction perpendicular to the fore-to-aft direction of the vessel;
   a first linear sidescan transducer element have a substantially rectangular shape, wherein the first linear sidescan transducer element is positioned within the housing and aimed to the port side of the vessel;
   a second linear sidescan transducer element have a substantially rectangular shape, wherein the second linear sidescan transducer element is positioned within the housing and aimed to the starboard side of the vessel; and
   a sonar module electrically connected to at least the linear downscan transducer element and configured to transmit one or more transmit signals to at least the linear downscan transducer element, wherein the sonar module is configured to transmit at at least a first frequency and a second frequency, wherein the second frequency is different than the first frequency;
   wherein the linear downscan transducer element is configured to produce a first fan-shaped sonar beam at the first frequency into the underwater environment;
   wherein the linear downscan transducer element is configured to produce a second fan-shaped sonar beam at the second frequency into the underwater environment;
   wherein the linear downscan transducer element is configured to receive first sonar returns from the underwater environment and convert the first sonar returns to first sonar return data;
   wherein the first linear sidescan transducer element is configured to receive second sonar returns from the underwater environment and convert the second sonar returns to second sonar return data;
   wherein the second linear sidescan transducer element is configured to receive third sonar returns from the underwater environment and convert the third sonar returns to third sonar return data;
   wherein the sonar module is configured to receive the first sonar return data from the linear downscan transducer element and filter the first sonar return data based on the first frequency, wherein the sonar module is configured to receive the second sonar return data from the first linear sidescan transducer element and filter the second sonar return data based on the second frequency, and wherein the sonar module is configured to receive the third sonar return data from the second linear sidescan transducer element and filter the third sonar return data based on the second frequency.

2. The sonar system of claim 1, wherein the linear downscan transducer element is configured to produce each of the first fan-shaped sonar beam and the second fan-shaped sonar beam from a down face, a left face, and a right face of the linear downscan transducer element.

3. The sonar system of claim 2, wherein each of the first fan-shaped sonar beam and the second fan-shaped sonar beam produced by the linear downscan transducer element provides substantially continuous sonar coverage from the port side of the vessel to the starboard side of the vessel.

4. The sonar system of claim 2, wherein the first linear sidescan transducer element and the second linear sidescan transducer element are each configured as receive-only transducer elements.

5. The sonar system of claim 1, wherein the sonar module comprises a sonar signal processor configured to process the filtered first sonar data, the filtered second sonar data, and the filtered third sonar data.

6. The sonar system of claim 1, wherein the sonar module is configured to generate a first transmit signal at the first frequency for a first duration of time, wherein the sonar module is configured to generate a second transmit signal at the second frequency for a second duration of time, wherein the first duration of time is shorter than the second duration of time.

7. The sonar system of claim 1, wherein the first frequency is selected to be about 790 kilohertz (kHz) and the second frequency is selected to be about 820 kHz.

8. The sonar system of claim 1, wherein the first frequency is selected to be about 430 kilohertz (kHz) and the second frequency is selected to be 480.

9. The sonar system of claim 1, wherein the sonar module is configured to generate the transmit signal as a pulse having at least a first portion at the first frequency and at least a second portion at the second frequency.

10. The sonar system of claim 9, wherein the sonar module is configured to generate the transmit signal such that the first portion defines a first duration of time and the second portion defines a second duration of time, wherein the first duration of time is shorter than the second duration of time.

11. The sonar system of claim 1, wherein the sonar module is electrically connected to the first linear sidescan transducer element and the second linear sidescan transducer element and configured to transmit the one or more transmit signals to the first linear sidescan transducer element and the second linear sidescan transducer element, wherein the first linear sidescan transducer element is configured to produce a fan-shaped sonar beam at the second frequency into the underwater environment, and wherein the second linear sidescan transducer element is configured to produce a fan-shaped sonar beam at the second frequency into the underwater environment.

12. The sonar system of claim 1 further comprising a display element configured to display at least one image of the underwater environment based on at least one of the first sonar return data, the second return data, and the third sonar return data.

13. A method for imaging an underwater environment underneath a vessel configured to travel along a surface of a body of water, the method comprising:
   transmitting, via a sonar module, one or more transmit signals to a linear downscan transducer element, wherein the sonar module is electrically connected to the linear downscan transducer element, wherein the sonar module is configured to transmit at at least a first frequency and a second frequency, wherein the second frequency is different than the first frequency;
   producing, at the first frequency, a first fan-shaped sonar beam into the underwater environment from the linear downscan transducer element, wherein the linear downscan transducer element has a substantially rectangular shape and is positioned within the housing and configured to produce a fan-shaped sonar beam directly beneath the vessel, wherein the fan-shaped sonar beam has a narrow beamwidth in a direction parallel to a fore-to-aft direction of the vessel and a wide beamwidth in a direction perpendicular to the fore-to-aft direction of the vessel;

producing, at the second frequency, a second fan-shaped sonar beam into the underwater environment;

receiving, via the linear downscan transducer element, first sonar returns from the underwater environment and converting the first sonar returns into first sonar return data;

receiving, via the first linear sidescan transducer element, second sonar returns from the underwater environment and converting the second sonar returns into second sonar return data;

receiving, via the second linear sidescan transducer element, third sonar returns from the underwater environment and converting the third sonar returns into third sonar return data;

receiving, via the sonar module, the first sonar return data from the linear downscan transducer element and filtering the first sonar return data based on the first frequency;

receiving, via the sonar module, the second sonar return data from the first linear sidescan transducer element and filtering the second sonar return data based on the second frequency; and receiving, via the sonar module, the third sonar return data from the second linear sidescan transducer element and filtering the third sonar return data based on the second frequency.

14. The method of claim 13, wherein the linear downscan transducer element is configured to produce each of the first fan-shaped sonar beam and the second fan-shaped sonar beam from a down face, a left face, and a right face of the linear downscan transducer element.

15. The method of claim 14, wherein each of the first fan-shaped sonar beam and the second fan-shaped sonar beam produced by the linear downscan transducer element provides substantially continuous sonar coverage from the port side of the vessel to the starboard side of the vessel.

16. The method of claim 14, wherein the first linear sidescan transducer element and the second linear sidescan transducer element are each configured as receive-only transducer elements.

17. The method of claim 13, wherein the sonar module is configured to generate a first transmit signal at the first frequency for a first duration of time, wherein the sonar module is configured to generate a second transmit signal at the second frequency for a second duration of time, wherein the first duration of time is shorter than the second duration of time.

18. The method of claim 13, wherein the sonar module is configured to generate the transmit signal as a pulse having at least a first portion at the first frequency and at least a second portion at the second frequency.

19. The method of claim 18, wherein the sonar module is configured to generate the transmit signal such that the first portion defines a first duration of time and the second portion defines a second duration of time, wherein the first duration of time is shorter than the second duration of time.

20. The method of claim 13 further comprising:
transmitting, via the sonar module, the one or more transmit signals to the first linear sidescan transducer element and the second linear sidescan transducer element;
producing, via the first linear sidescan transducer element, a fan-shaped sonar beam at the second frequency into the underwater environment; and
producing, via the second linear sidescan transducer element, a fan-shaped sonar beam at the second frequency into the underwater environment.

21. The method of claim 13 further comprising displaying, via a display element, at least one image of the underwater environment based on at least one of the first sonar return data, the second return data, and the third sonar return data.

* * * * *